United States Patent [19]
Faris et al.

[11] Patent Number: 5,801,793
[45] Date of Patent: Sep. 1, 1998

[54] BACKLIGHTING CONSTRUCTION FOR USE IN COMPUTER-BASED DISPLAY SYSTEMS HAVING DIRECT AND PROJECTION VIEWING MODES OF OPERATION

[75] Inventors: Sadeg M. Faris, Pleasantville; Carl Tung, Ossining, both of N.Y.

[73] Assignee: Reveo, Inc., Hawthorne, N.Y.

[21] Appl. No.: 322,219

[22] Filed: Oct. 13, 1994

Related U.S. Application Data

[63] Continuation-in-part of Ser. No. 230,779, Apr. 21, 1994.

[51] Int. Cl.$^6$ .................. G02F 1/1335; G02F 1/1347; G02B 21/56; G02B 21/132
[52] U.S. Cl. ..................... 349/5; 349/15; 349/57; 349/58; 349/64; 349/65; 349/68; 349/70; 349/77; 349/86; 359/465; 353/122
[58] Field of Search .................. 359/40, 41, 48, 359/53, 465; 353/122, 71, 72, 119, DIG. 3, DIG. 5; 345/32, 104; 362/31, 32; 385/129, 130, 901; 364/231.1; 349/5, 15, 57, 58, 62, 64, 65, 68, 86, 77, 96

[56] References Cited

U.S. PATENT DOCUMENTS

| | | | |
|---|---|---|---|
| 4,917,465 | 4/1990 | Conner et al. | 349/5 |
| 4,950,072 | 8/1990 | Honda | 353/122 |
| 5,041,965 | 8/1991 | Chen | 345/7 |

(List continued on next page.)

FOREIGN PATENT DOCUMENTS 6-167689  6/1994  Japan.

OTHER PUBLICATIONS

"Invited Address: New Backlighting Technologies for LCDs" by Y. Mesaki, et al. of Fujitsu Ltd. published in SID 94 Digest 1994, pp. 281–284.

(List continued on next page.)

Primary Examiner—William L. Sikes
Assistant Examiner—Tai V. Duong
Attorney, Agent, or Firm—Thomas J. Perkowski, Esq.

[57] ABSTRACT

A reconfigurable backlighting construction for use in portable computer-based systems having direct and projection viewing modes of operation. In the illustrative embodiments of the present invention, the backlighting construction is integrated with a LCD display panel, a micropolarization panel, and a touch-screen writing panel to provide several different types of portable computer-based systems including, for example, a portable notebook computer, a computer-driven image display device, and a portable pen-computing device. In general, each of these computer-based systems are capable of selectively displaying color video images on an actively driven display surface, or projecting such video images onto a wall surface or projection screen without the need for a bulky overhead projector, required by all prior art systems. These computer-based systems can be easily reconfigured for projection viewing without physical removal of the light guiding panel and its light diffusing structures. If desired, these computer-based systems can be used to directly view "spatially-multiplexed" images of 3-D objects or imagery during the direct viewing mode, and when desired these spatially-multiplexed images can be projected onto a wall surface or projection screen during the projection viewing mode. When the spatially-multiplexed images are viewed through electrically-passive polarized glasses, the 3-D object is perceived with stereoscopic depth sensation in either mode of viewing. A portable light projection accessory device is provided for use with the portable computer-based systems of the present invention. In the illustrative embodiments, the portable light projection device has first and second housing portions that are interconnected by a foldable structure that permits the first and second housing portions to be selectively reconfigured for simple trouble-free use during the projection viewing mode of operation, and for compact storage during the direct viewing mode of operation.

36 Claims, 18 Drawing Sheets

U.S. PATENT DOCUMENTS

| | | | |
|---|---|---|---|
| 5,050,946 | 9/1991 | Hathaway et al. | 349/64 |
| 5,052,078 | 10/1991 | Hosoi | 364/708.1 |
| 5,101,197 | 3/1992 | Hix et al. | 353/122 |
| 5,175,672 | 12/1992 | Conner et al. | 361/680 |
| 5,264,992 | 11/1993 | Hagdahl et al. | 361/681 |
| 5,325,218 | 6/1994 | Willett et al. | 359/53 |
| 5,353,075 | 10/1994 | Conner et al. | 353/122 |
| 5,526,146 | 6/1996 | Goodman et al. | 359/40 |

OTHER PUBLICATIONS

"New Backlighting Technologies for LCDs" by Kevin J. Hathaway, Jeffery A. Hawthorne and Allan Fleischer of Display Engineering, Inc., Santa Rosa, CA., published in Society of Information Display (SID) 91 Digest, pp. 751–754, 1991.

"A Flat Collimator: A Backlighting Assembly Utilizing Microprisms for High Energy Efficiency" by Y. Tai and H. Zou of BriteView Technologies, Inc. of Toledo, Ohio, published in SID 94 Digest Applications Digest, pp. 10–13, 1994.

"Multiplicity of Discharge Channels For a Flat Fluorescent Lamp to Backlight a Full Color LCD" by M. Anandan and Doug Ketchum, of Thomas Electronics, Inc. Wayne, New Jersey. No Date Provided.

"A Non–Imaging CCFT Coupler for LCD Backlighting" by F. Lin, of CTX Opt–Electronics Corp., Taiwan R.O.C., published in SID 94 Applications Digest, pp. 14–15, 1994.

"A Full–Color Field–Sequential LCD Using Modulated Backlight" by H. Hasebe, and S. Kobayashi, Tokyo University of Agriculture and Technology, Tokyo, Japan, published in SID 85 Digest, pp. 81–83 1985.

"High–Brightness Backlights for Color LCDs" by S. Lu Bohary, of Landmark Technology, San Jose, CA, published in SID 94 Applications Digest, pp. 6–9.

"Desktop Projection Products: LCD Projection Panel, LCD Projectors and Interactive Pointer Systems" catalogue by Proxima, Inc Brochure No. 709–001174–1, No Date Provided.

"Figure 1: How The Touch Screen Works" in the Newton MessagePad, published in Oct. 1993 MacUser (1 page).

"Diffraction–grating–enhanced light emission from tunnel junctions" by J.R., Kirtlay, et al. Thomas J. Watson Research Center, Yorktown Heights, Applied Physics Letters vol. 37, No. 5, Sept. 1, 1980. pp. 435–437.

BACKLIGHTING CONSTRUCTION FOR USE IN COMPUTER-BASED DISPLAY SYSTEMS HAVING DIRECT AND PROJECTION VIEWING MODES OF OPERATION

RELATED CASES

This is a Continuation-in-Part of copending application Ser. No. 08/230,779 entitled "ELECTRO-OPTICAL BACKLIGHTING PANEL FOR USE IN COMPUTER-BASED DISPLAY SYSTEMS AND PORTABLE LIGHT PROJECTION DEVICE FOR USE THEREWITH" by Sadeg M. Faris, filed Apr. 21, 1994, which is incorporated herein by reference as if set forth fully herein.

BACKGROUND OF INVENTION

1. Field of Invention

The present invention relates to computer-based systems having both direct and projection viewing modes of operation.

2. Brief Description of the Prior Art

Presently, most portable computing systems include a flat liquid crystal display(LCD) panel for directly viewing video imagery displayed thereon. Portable computer systems of this type include notebook, laptop, and palmtop computers.

In general, prior art LCD display panels have essentially the same basic construction in that each includes a conventional backlighting structure affixed to the rear surface of either a passive or active matrix LCD panel. Several different backlighting panel designs are described in the technical paper "New Backlighting Technologies for LCDs" by Kevin J. Hathaway, et al., published at pages 751–754 in SID 91 Digest. In recent times, the "light pipe" backlight design, in particular, has been widely used in many commercially available notebook computers.

Specifically, prior art "light pipe" backlight assemblies are constructed from a rectangularly shaped light guiding panel, typically fabricated from an acrylic plastic sheet having a thickness of about 4 millimeters or so. Along the opposite side edges of the acrylic sheet, a pair of miniature fluorescent light tubes are mounted within suitably designed light reflective mounts. The function of the fluorescent light tubes is to produce and direct incoherent light into the interior of the light guiding panel within which the light is typically bounded by the well known principle of "total internal reflection". Under ideal conditions, light will not leak out of the surfaces of the acrylic plastic sheet. However, light can be extracted or leaked out from these surfaces by forming therein scratches, undulations, or any other means of locally altering the critical angle for total internal reflection. By achieving light extraction in this manner, the backlighting panel can be used to illuminate an LCD panel.

In order to compensate for the decrease in light intensity in the light guiding panel at distances away from the fluorescent tubes, a light extracting pattern is permanently formed on one or both surfaces of the light guiding panel. Typically the light extracting pattern is realized as a dot pattern permanently embossed or sand-blasted upon the front surface of the acrylic light guiding panel. The density of the dot pattern is made to increase quadratically with distance from the fluorescent light tubes in order to achieve light intensity compensation along the light guiding panel. With this construction, a constant backlighting brightness is maintained across the light guiding panel.

In order to integrate (i.e. diffuse) the spotted distribution of light emanating from the light extracting pattern towards the LCD panel, a first light diffusing structure is placed on top of the light guiding panel. Typically, the first light diffusing structure is made from one or more thin sheets of translucent plastic attached to the front surface of the light guiding panel. In most commercial "light pipe" backlight designs, a second light diffusing structure is placed over the rear surface of the light guiding panel to diffuse the spotted distribution of light emanating from the permanently formed light extracting pattern towards the reflective surface disposed behind the light guiding panel. Typically, the second light diffusing structure is made from one or more thin sheets of translucent plastic attached to the rear surface of the light guiding panel. Together, the light guiding panel, fluorescent light tubes, light diffusing sheets and the light reflective layer cooperate to produce a plane of backlight having a uniform spatial intensity for optical processing by the LCD panel affixed to the backlighting panel.

While the prior art backlighting panel design described above has proven useful in the direct viewing of visual imagery on LCD display screens, its permanently formed light extracting pattern renders it unsuitable in projection viewing modes of operation. This fact is best illustrated by example.

In the recently introduced notebook computer, marketed under the tradename "Cruiser™" by EMCO/REVERED Technologies, Inc., the above-described "light pipe" backlighting panel design is used to construct a portable computer system having both direct and projection viewing modes of operation. In the direct viewing mode, the prior art backlighting panel is positioned against the active-matrix LCD panel. Each time the user desires to operate the notebook computer in its projection viewing mode, the user must mechanically reconfigure the Cruiser™ notebook computer by physically removing the prior art backlighting panel in order to reveal the active matrix LCD panel, and provide an optically clear path for the light rays to pass therethrough.

Recently, Intellimedia, Corporation of Benton Harbor, Michigan has introduced the IntelliMedia™ Multimedia Presentation System which consists of portable computer system having a flat LCD projection panel which can support both direct and projection viewing modes. In the direct viewing mode, the user is required to affix an auxiliary backlighting panel beneath the LCD panel. Then, when operated in the projection viewing mode, the user is required to remove the auxiliary backlighting panel, and place the LCD panel upon an external overhead projector, much like that required by the Cruiser™ computer system.

While the above-described computer-based systems provide both direct and projection viewing modes, they both nevertheless suffer from a number of serious shortcomings and drawbacks which make them less than commercially attractive products.

In particular, the need to physically remove the entire backlighting panel from the Cruiser™ computer during its projection viewing mode, poses a substantial risk of damage to the backlighting panel and imposes an added responsibility upon the user to safely store the same when the computer system is operated in its projection viewing mode. Also, from a practical standpoint, the need to place the display panel assembly of the Cruiser™ computer and the entire display panel of the Intellimedia™ system upon an overhead projector during projection viewing, necessitates that the user either tote an overhead projector along with such prior art systems, or have access to one during projection viewing. Consequently, such prior art systems lack the versatility of operation in either direct or projection modes of viewing, and thus are incapable of functioning as truly portable systems.

Thus, there is a great need in the art for an improved portable computer-based system which has direct and projection viewing modes, without the shortcomings and drawbacks of the prior art systems.

OBJECTS OF THE PRESENT INVENTION

Accordingly, a primary object of the present invention is to provide a novel backlighting panel construction particularly designed for use in portable computer-based systems having both direct and projection viewing modes of operation.

A further object of the present invention is to provide an improved portable computer-based system having direct and projection viewing modes.

A further object of the present invention is to provide a novel computer-based system which can be easily reconfigured for its projection viewing mode of operation without detachment of the backlighting panel from the computer system.

A further object of the present invention is to provide a portable device for illuminating the display panel of such a computer-based system in order to project focused video images therefrom onto a desired viewing surface.

A further object of the present invention is to provide a portable computer-based system with a rear housing panel that is hingedly connected to a light guiding panel that supports a light reflective surface and covers the rear light transmission aperture when the system is operated in its direct viewing mode.

A further object of the present invention is to provide such a portable computer-based system, in which the display panel assembly includes a thin lens panel, such a Fresnel or holographic lens panel, for use during the projection viewing mode.

A further object of the present invention is to provide such a portable computer-based system, in which a film slide or optical transparency carrying imagery can be placed upon the display surface of the display panel assembly and the imagery viewed in either the direct or projection viewing mode.

A further object of the present invention is to provide a portable computer-based system having both direct and projection viewing modes of operation, in which "spatially-multiplexed" images of 3-D objects or imagery are viewable through an LCD panel during the direct viewing mode and viewable on a wall surface or projection screen during the projection viewing mode, so as to permit the 3-D object to be perceived with stereoscopic depth sensation when the spatially-multiplexed images are viewed through electrically-passive polarized viewing spectacles.

A further object of the present invention is to provide a portable image display system having both direct and projection viewing modes of operation so that it is capable of selectively displaying color video images on an actively driven display surface, such as an LCD display panel, or projecting such video images onto an electrically-passive viewing surface, such as a wall surface or projection screen.

A further object of the present invention is to provide a portable pen-computing device capable of supporting pen-based data entry operations and stereoscopic image display in both direct and projection viewing modes of operation.

A further object of the present invention is to provide a portable light projection accessory device that is particularly adapted for use with the portable computer-based system of the present invention.

A further object of the present invention is to provide such a portable light projection device having first and second housing portions that are interconnected by a foldable structure that permits these housing portions to be selectively reconfigured for use during the projection viewing mode of operation, and for compact storage during the direct viewing mode of operation.

A further object of the present invention is to provide such a portable light projection device, wherein the first housing portion contains means for producing an intense source of polarized light, and an optics assembly for projecting the produced polarized light, and wherein the second housing portion contains an image projection lens that can be adjustably positioned with respect to the display panel assembly thereof for projecting a focused video image onto a desired viewing surface.

A further object of the present invention is to provide a novel method of projecting images from such a portable computer-based system.

An even further object of the present invention is to provide such a computer-based system in the form of either a palmtop, laptop or notebook computer, personal digital assistant or personal communicator which, with the portable light projecting device hereof, can be easily stored and transported in a lightweight carrying case having physical dimensions on the same order as the portable computer itself.

These and other objects of the present invention will become apparent hereinafter and in the Claims to Invention.

SUMMARY OF THE PRESENT INVENTION

In accordance with one of the broader aspects of the present invention, a novel backlighting construction is provided for use in illuminating flat panel displays, optical transparencies, film structures and the like.

In general, the backlighting construction comprises a light producing panel, a thin lens panel and a programmable spatial light modulation panel, such as a LCD panel, all of which are assembled together and mounted within the display panel portion of the housing of a portable computer system. In the illustrative embodiment, the portable computer system has front and rear light transmission apertures and direct and projection viewing modes. The rear light transmission aperture is covered by a rear housing panel during the direct viewing mode, while both front and rear light transmission apertures are open during the projection viewing mode. Preferably, the exterior surface of the rear housing panel has a surface texture that matches the exterior surface of the computer system housing.

In the first illustrative embodiment, the light producing panel comprises a light guiding panel and a light producing means. The light guiding panel has a light conducting surface, first and second light guiding surfaces disposed perpendicular thereto, light diffusive layers disposed closely but not contacting the light guiding surfaces, and a light extracting pattern permanently formed along the second light guiding surface. The light producing means, thin lens panel and LCD panel are permanently mounted as a subassembly in the display panel portion of the computer system housing, whereas the light guiding panel and the rear housing panel are hingedly connected to the display panel portion of the computer system housing. One end of the light guiding panel is hingedly connected to the interior of the display panel portion of the computer system housing in order to permit the light extraction surface of the light guiding panel to be disposed adjacent the thin lens and LCD panel subassembly during the direct viewing mode. The other end of the light guiding panel is hingedly connected to one end of the rear housing panel so as to permit covering of the rear light transmission aperture during the direct viewing mode. The interior surface of the rear housing panel is light reflective, while the surface texture of the outer surface of the rear housing panel preferably matches the computer system housing.

During the direct viewing mode, the light guiding panel and rear cover panel are hingedly configured within the display panel portion of the computer system housing so that the light reflective surface is disposed adjacent the second light guiding surface of the light guiding structure, while the light extraction pattern of the light guiding panel is disposed adjacent the thin lens panel. In the direct viewing mode, the light producing means produces visible light for transmission through the light conducting edge in the light guiding panel and into the light guiding panel, wherein it is totally internally reflected between the first and second light guiding surfaces thereof. In the direct viewing mode, the light extracting pattern scatters light rays internally reflected within the light guiding panel, and as such, a certain percentage of these scattered light rays are no longer satisfy the conditions for total internal reflection within the light guiding panel. Consequently, these scattered light rays are permitted to pass or leak through the second light guiding surface of the light guiding panel, and thence through the thin lens and LCD panel subassembly.

During the projection viewing mode, rear housing panel and light guiding panel are hingedly reconfigured and supported at about a 45 degree angle with respect to the rear light transmission aperture, and light is preferably not produced from the light producing means. Instead, during the projection viewing mode, light is produced from an external light source disposed beneath the supported rear housing panel and projected through the light guiding panel. During the projection viewing mode, the light extraction pattern is disposed behind the light reflective surface and thus projected light rays from the external light source are reflected off the light reflective surface, and not the light diffusive structures mounted on the light guiding panel, permitting the reflected light to pass freely through thin lens and LCD panel subassembly with minimal light scattering. During the projection viewing mode, the projected light rays emerge from the LCD panel modulated in spatial intensity and after passing through an external projection lens, form images on a viewing surface, such as a wall surface or projection screen. This novel approach eliminates altogether the need for additional bulky overhead projection devices required by all prior art systems.

In another illustrative embodiment, a novel stereoscopic viewing system is provided by affixing a micropolarization panel to the display surface of the computer system of the present invention. The stereoscopic viewing system can be used in either direct or projection viewing modes of operation.

In yet another illustrative embodiment, a novel writing/display system is provided by affixing a conventional pressure-sensitive electro-optical writing panel to the display surface of the computer system of the present invention.

The numerous advantages derived using the backlighting panel construction of the present invention will become apparent hereinafter.

BRIEF DESCRIPTION OF THE DRAWINGS

For a more complete understanding of the present invention, the Detailed Description of the Illustrative Embodiments of the Present Invention is to be read in conjunction with the following drawings, in which.

DETAILED DESCRIPTION OF THE ILLUSTRATIVE EMBODIMENTS OF THE PRESENT INVENTION

In general, the backlighting construction of the present invention can be used in various backlighting applications. In the illustrative embodiments, the backlighting construction is incorporated into six different portable computer-based systems, namely: the portable notebook/laptop computer system illustrated in FIGS. 1 to 4C and 5 to 5A; the portable notebook/laptop computer system illustrated in FIG. 4C in particular; the portable image display device illustrated in FIGS. 9 to 9B; the portable pen-computing device illustrated in FIGS. 10 to 10B; the portable notebook/laptop computer system illustrated in FIG. 11; the portable notebook/laptop computer system illustrated in FIG. 12; and the portable notebook/laptop computer system illustrated in FIG. 13. It is understood, however, that the backlighting construction of the present invention may be used with other types of computer-based systems and equipment, including computer monitors, optical transparencies, film structures and the like, without departing from the scope and spirit of the present invention. Throughout the drawings, like figures shall be indicated with like reference numbers.

Figure 1:
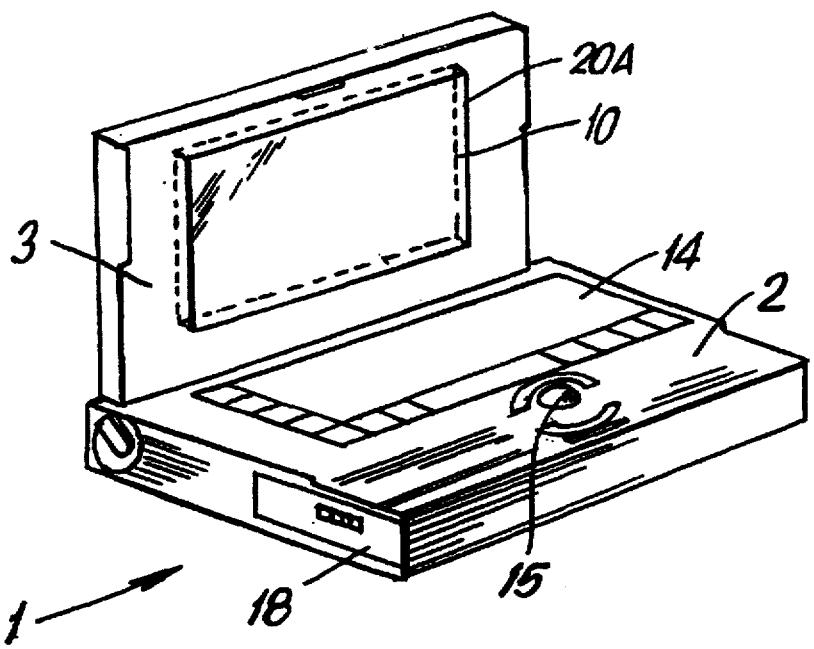
FIG. 1 is a first perspective view of the portable computer system of the first illustrative embodiment of the present invention, shown arranged in its direct viewing configuration.
Figure 1A:
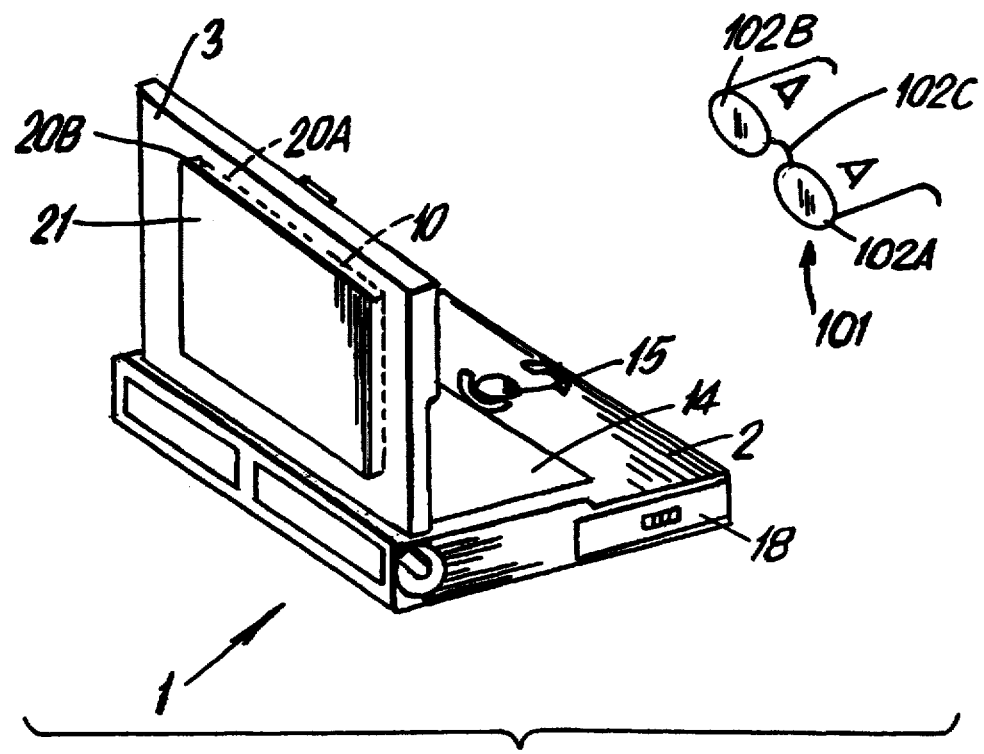
FIG. 1A is a second perspective view of the portable computer-based system of FIG. 1, shown arranged in its direct viewing configuration.
Figure 2:
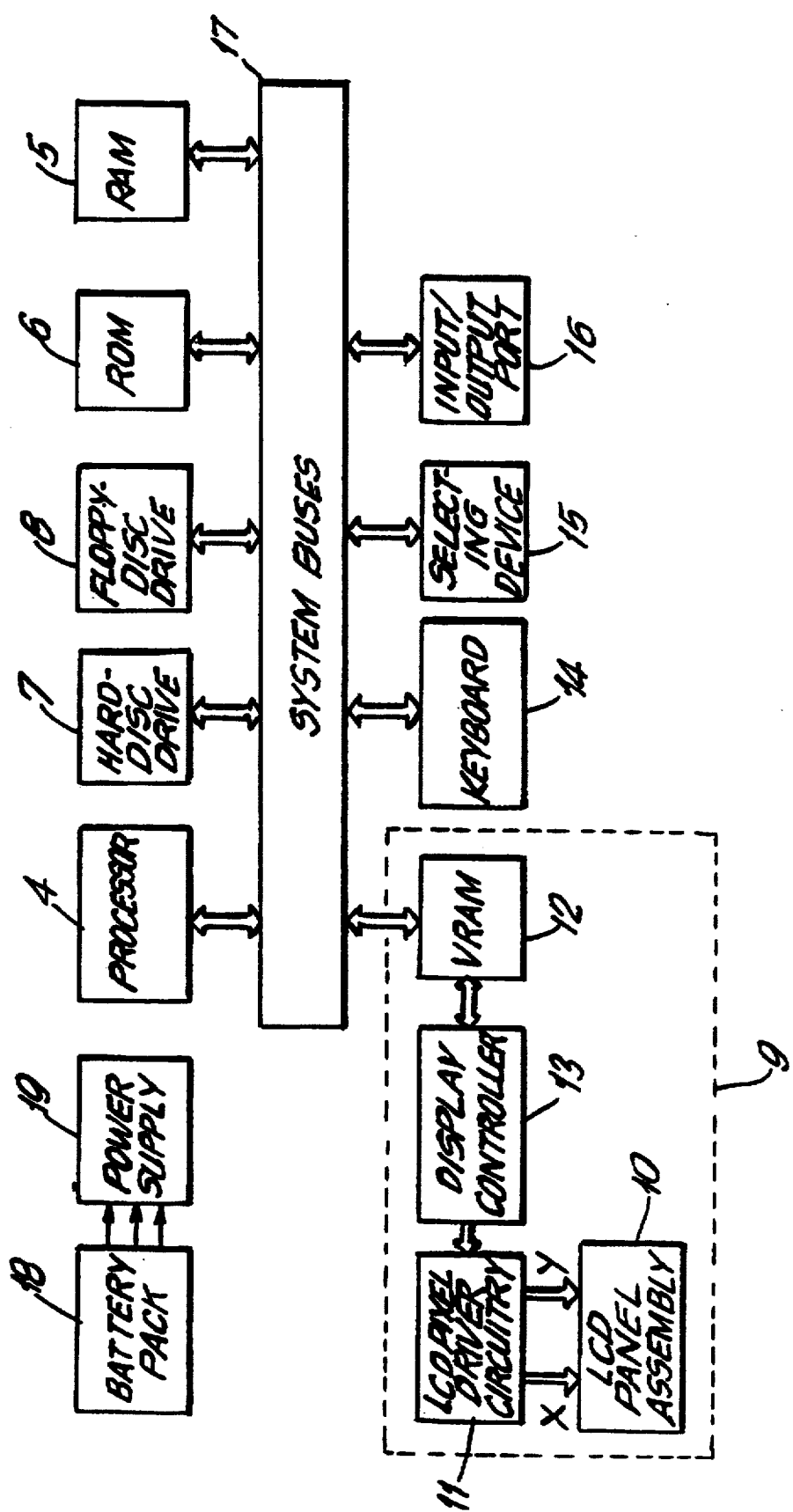
FIG. 2 is a block system diagram of the portable computer system shown in FIGS. 1 and 1A.

As shown in FIGS. 1 and 1A, portable computer system 1 includes a housing having a base portion 2 and a hingedly connected display (or cover) portion 3. As illustrated in FIG. 2, portable computer system 1 comprises a number of integrated system components, namely: one or more central processing units 4 (e.g. microprocessors); high-speed random access memory storage device (e.g. RAM) 5 for storing system parameters, operating system routines, application programs, and the like during execution; a high-speed read only memory device (e.g. ROM) 6 for storing portions of an operating system program; a hard-disc drive subsystem 7 for reading and writing onto hard-type magnetic or opoptical discs, information files, programs, image data and the like for long term storage; a floppy-disc drive subsystem 8 for reading and writing onto floppy-type magnetic discs, information files, programs, image data and the like for long term storage; a visual display subsystem 9 including a flat display panel assembly 10 in accordance with the present invention, and X and Y driver circuitry 11 for use therewith shown in FIG. 3; a video image storage subsystem including a video random access memory device (e.g., VRAM) 12 for buffering frames of video data to be displayed on the display panel assembly, and a display processor 13 for accessing frames of video data stored in VRAM 12 and providing these video frames to the X and Y driver circuitry 11; a keyboard or other text input device 14 and associated interface circuitry; a pointing and selecting device (e.g. mouse or track-ball) 15 and interface circuitry and an external input/output port 16 for interfacing one or more input or output devices, such as CD-ROM (optical disc) player, stereo-video camera, facsimile unit, and the like. As illustrated, each of these system components is operably associated with processor(s) 4 by way of one or more system buses 17 in a manner known in the art. In addition, the computer system also includes a rechargeable battery pack 18 and power distribution circuitry 19 well known in the portable computing art.

In the preferred embodiment, the operating system may be realized by Macintosh® System 7.5 operating system software from Apple Computer, Inc., Windows® operating system software from Microsoft Corporation, or Unix® X-Windows operating system software, allowing the processors to support a plurality of input/output windows, pointing and selecting device 15, and multi-media input and output devices. It is understood, however, that other suitable operating system programs can be used with acceptable results without departing from the scope and spirit of the present invention.

In the first illustrative embodiment of the computer-based system, all of the above-described system components, except for display panel assembly 10, are contained in the base portion of the computer housing shown in FIGS. 1 and 1A, and only display panel assembly 10 is mounted within the hinged cover portion of the housing. It is understood, however, the particular distribution of system components will vary from embodiment to embodiment of the present invention.

As shown in FIGS. 1 and 1A, the front and rear sides of housing cover portion 3 have rectangular light transmission apertures 20A and 20B, respectively, formed therethrough. The size of these apertures are substantially the same, yet slightly smaller in length and width dimensions than display panel assembly 10 of the present invention in order to support the perimetrical edges of the display panel assembly in a conventional manner known in the art.

Figure 4:
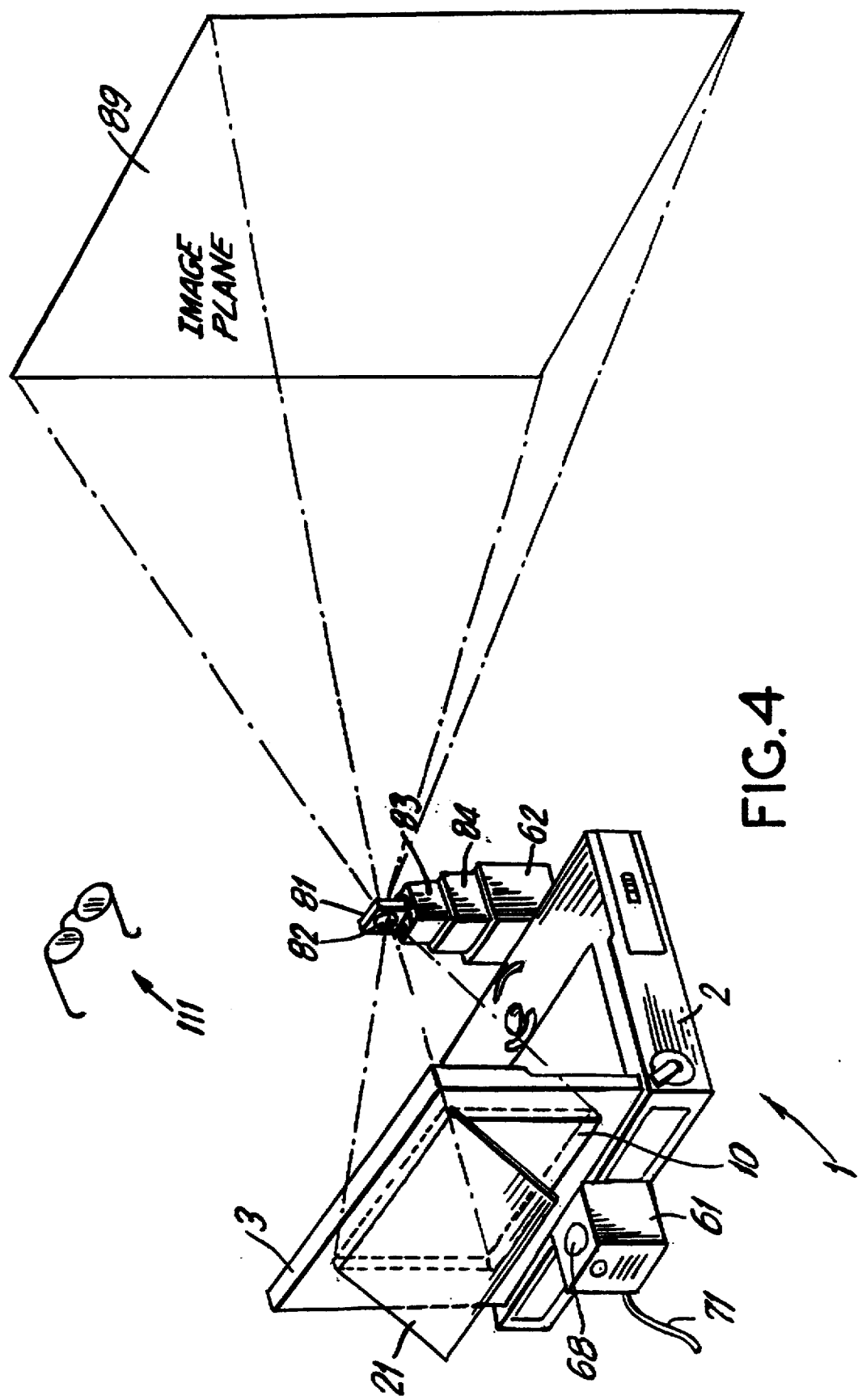
FIG. 4 is a perspective view of the portable computer-based system of the first illustrative embodiment, shown arranged in its projection viewing configuration.

In the direct viewing configuration shown in FIGS. 1A, optically opaque rear housing panel 21 completely closes off rear light transmission aperture 20B when rear housing panel 21 is fitted within the plane of rear light transmission aperture 20B when the system is arranged in its direct viewing configuration shown in FIG. 1A. This fit between the rear housing panel 21 and light transmission aperture 20B is achieved by making the physical dimensions of rear housing panel 21 slightly smaller than the dimensions of the rear light transmission aperture 20B. When the portable computer system is arranged into its projection viewing configuration as shown in FIG.4, rear housing panel 21 is reconfigured and supported at about a 45 degree angle with respect to the plane of display panel assembly 10. The unique manner in which the display panel assembly of the present invention is physically reconfigured from the direct viewing mode to the projection viewing mode, will be described in great detail below.

Figure 3:
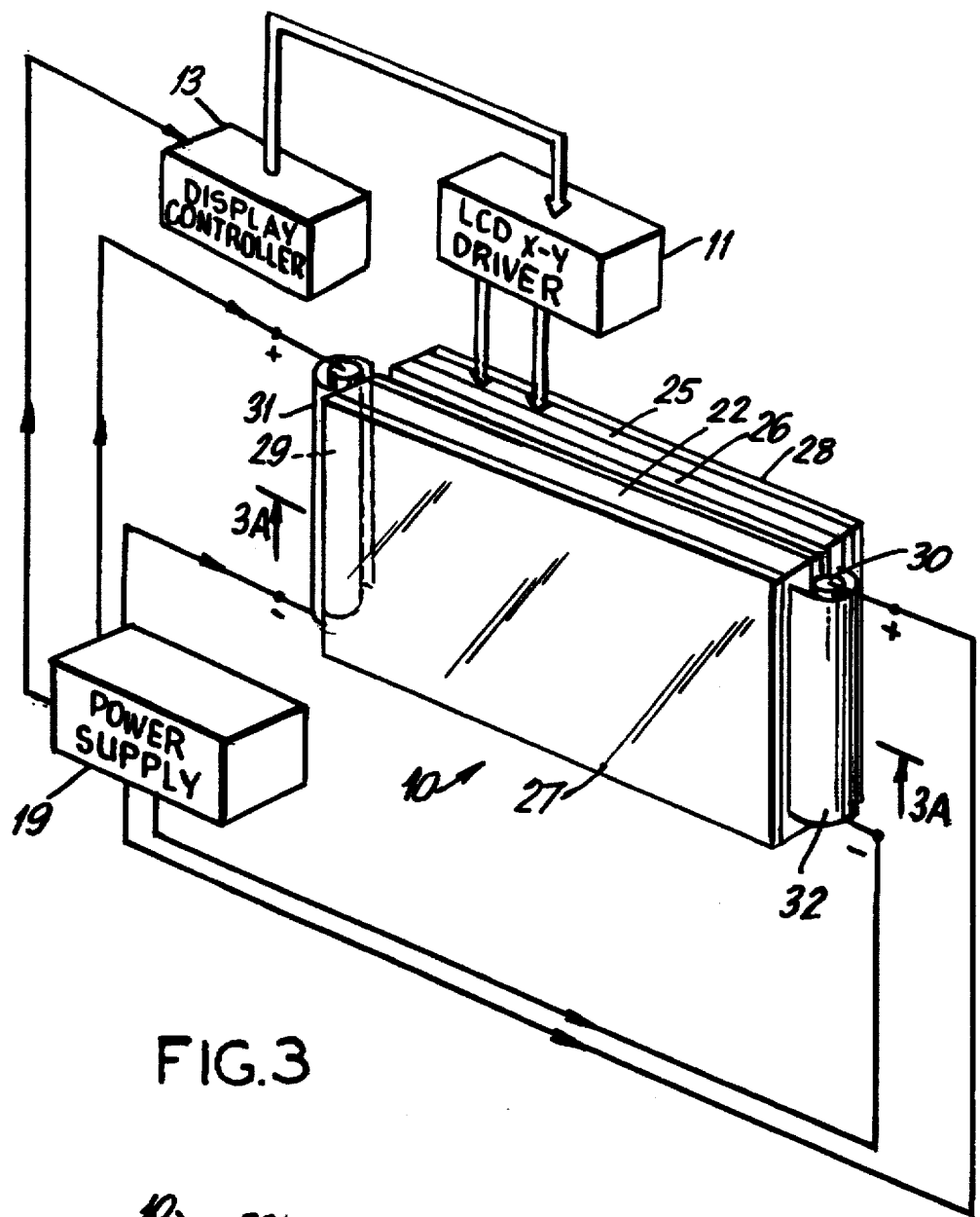
FIG. 3 is a schematic representation of the image display subsystem of the portable computer system of the first illustrative embodiment, shown in its direct viewing configuration.
Figure 3A:
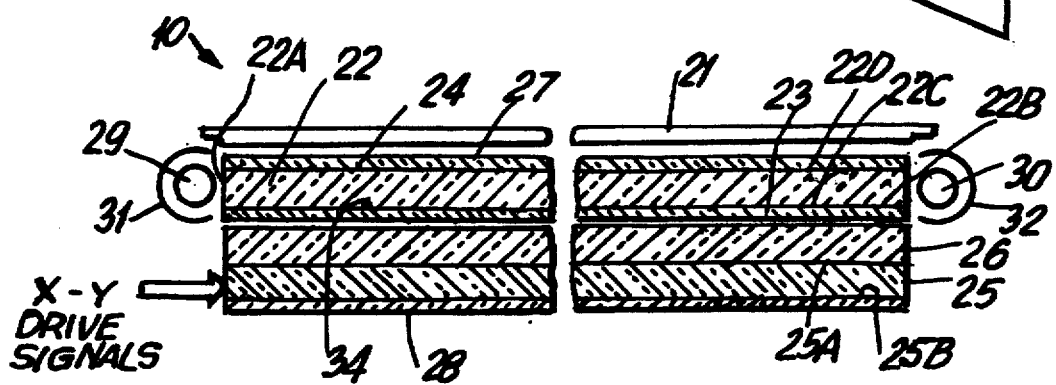
FIG. 3A is a cross-sectional view of the display panel assembly of the first illustrative embodiment, taken along line 3A—3A of FIG. 3, showing the electro-optical light diffusing panels thereof.

As illustrated in FIGS. 3 and 3A, display panel assembly 10 comprises a number of subcomponents, namely: a light guiding structure 22, preferably realized in the form of a thin, rectangularly shaped, optically transparent light guiding panel having first and second light conductive edges 22A and 22B, and front and rear light guiding surfaces 22C and 22D; first and second light diffusing (i.e. scattering) panels 23 and 24 permanently mounted to light guiding surfaces 22C and 22D with an ultra-thin air gap provided therebetween for index of refraction mismatching across the interface; a programmable spatial light modulator(SLM), realized as an active-matrix LCD panel 25, permanently mounted within the display panel portion of the computer system housing and having front and rear surfaces 25A and 25B; an ultra-thin light focusing element 26, such as a Fresnel lens panel or holographic lens, directly laminated to the rear surface of LCD panel 25; a light reflective surface 27 permanently provided to the interior surface of the rear housing panel 21; and micropolarization panel 28 directed laminated to front surface of LCD panel 25. As illustrated, light conducting edges 22A and 22B extend perpendicular to the light guiding surfaces 22C and 22D. Preferably, light guiding panel 22 is fabricated from an acrylic plastic sheet having a thickness of about 4 millimeters or so. Along the opposite side edges of the acrylic sheet, a pair of miniature fluorescent light tubes 29 and 30 are mounted within suitably designed mounts and electrically connected to power supply 19 and controlled by processor 4. Notably, the fluorescent lighting tubes are closely positioned along and in close proximity with the light conducting side edges of light guiding panel. Elongated concave light reflectors 31 and 32 are closely mounted along side these fluorescent tubes in order to focus light through the light conducting edges 22A and 22B, respectively, when the computer system is configured in its direct viewing mode of operation. Light rays emitted from these lighting tubes are focused by reflectors 31 and 32 along the side edges of the light guiding panel, and effectively conducted into the interior thereof so that the light rays are normally bounded (i.e. internally reflected) between light guiding surfaces 22C and 22D in accordance with the well known optical principle of "total internal reflection".

When the ultra-thin light focusing element 26 is realized as a Fresnel lens panel 26, a Fresnel lens zone structure is formed in a thin optically transparent layer that is attached to the rear surface of active-matrix LCD display panel 25. When the system is configured for its direct viewing mode of operation, the second light diffusing panel 24 physically engages the rear surface of Fresnel panel 26 in order to maximize the conduction of light thereacross during the direct viewing mode of operation, as best shown in FIG. 3A. In the preferred embodiment, the overall thickness of the resulting composite structure, including the light guiding panel, the Fresnel lens panel and the LCD panel, is less than about 10 millimeters.

During the direct viewing mode of operation, the sole function of the fluorescent light tubes is to produce and direct incoherent light into the interior of light guiding panel 22. Under ideal conditions, light will not leak out beyond the outer surfaces of the acrylic plastic sheet used to realize light guiding panel 22. In order to extract or leak light out from between these surfaces during the direct viewing mode, scratches, undulations, or any other means of locally altering the critical angle for total internal reflection are formed in the light guiding surface of the light guiding panel, adjacent the Fresnel lens panel. Preferably, the light extracting pattern 34 is to achieve this light extraction or leakage function. In the illustrative embodiment, the light extracting pattern 34 is realized as a dot pattern permanently embossed or sandblasted upon the front surface of the acrylic light guiding panel. As such, the light guiding panel is capable of illuminating both the Fresnel and LCD panel during the direct viewing mode of operation.

The inherent decrease in light intensity emanating from the light guiding panel at distances away from the fluorescent tubes, is compensated for by making the density of the "dot pattern" (i.e. light extraction pattern) increase with distance from the fluorescent light tubes in a manner known in the art. With this construction, a constant backlighting brightness is maintained across the light guiding panel.

The first light diffusing structure 23 is mounted over the light guiding surface 22C of the light guiding panel, with an ultra-thin air gap therebetween. Very short projections extending from the exterior of light guiding surface 22C can be formed to maintain the necessary air gap between light diffusing panel 23 and light guiding surface 22C, adjacent the light reflective surface 27 in the direct viewing mode. The function of light diffusing panel 23 is to integrate (i.e. diffuse) spotted distribution of light emanating from the permanently formed light extracting pattern 34, towards the reflective surface 27 during the direct viewing mode of operation. Typically, the first light diffusing panel 23 is made from one or more thin sheets of translucent plastic attached to light guiding surface 22C of the light guiding panel.

Similarly, the second light diffusing panel 24 is mounted over the light guiding surface 22D of the light guiding panel, with an ultra-thin air gap therebetween. Very short projections extending from the exterior of light guiding surface 22D can also be formed to maintain the necessary air gap between light diffusing panel 24 and light guiding surface 22D. The function of light diffusing panel 24 is to integrate (i.e. diffuse) the spotted distribution of light emanating from the light extracting pattern towards the LCD panel during the direct viewing mode of the system. Typically, the second light diffusing panel 24 is also made from one or more thin sheets of translucent plastic attached to light guiding surface 22D of the light guiding panel. Together, light guiding panel 22, fluorescent light tubes 29 and 30, light diffusing panel 23 and 24 and light reflective layer 27 cooperate to produce a plane of backlight having a uniform distribution of spatial light intensity for optical processing by active-matrix LCD panel 25.

Micropolarization panel 28 is directly laminated onto the front surface of LCD panel 25 and functions to polarization-encode the composite pixels of spatially-multiplexed images (SMI) displayed from LCD panel 25 in either the direct viewing mode or projection viewing mode of the computer-based system. This component of the backlighting construction of the present invention will be described in greater detail hereinafter.

Figure 4A:
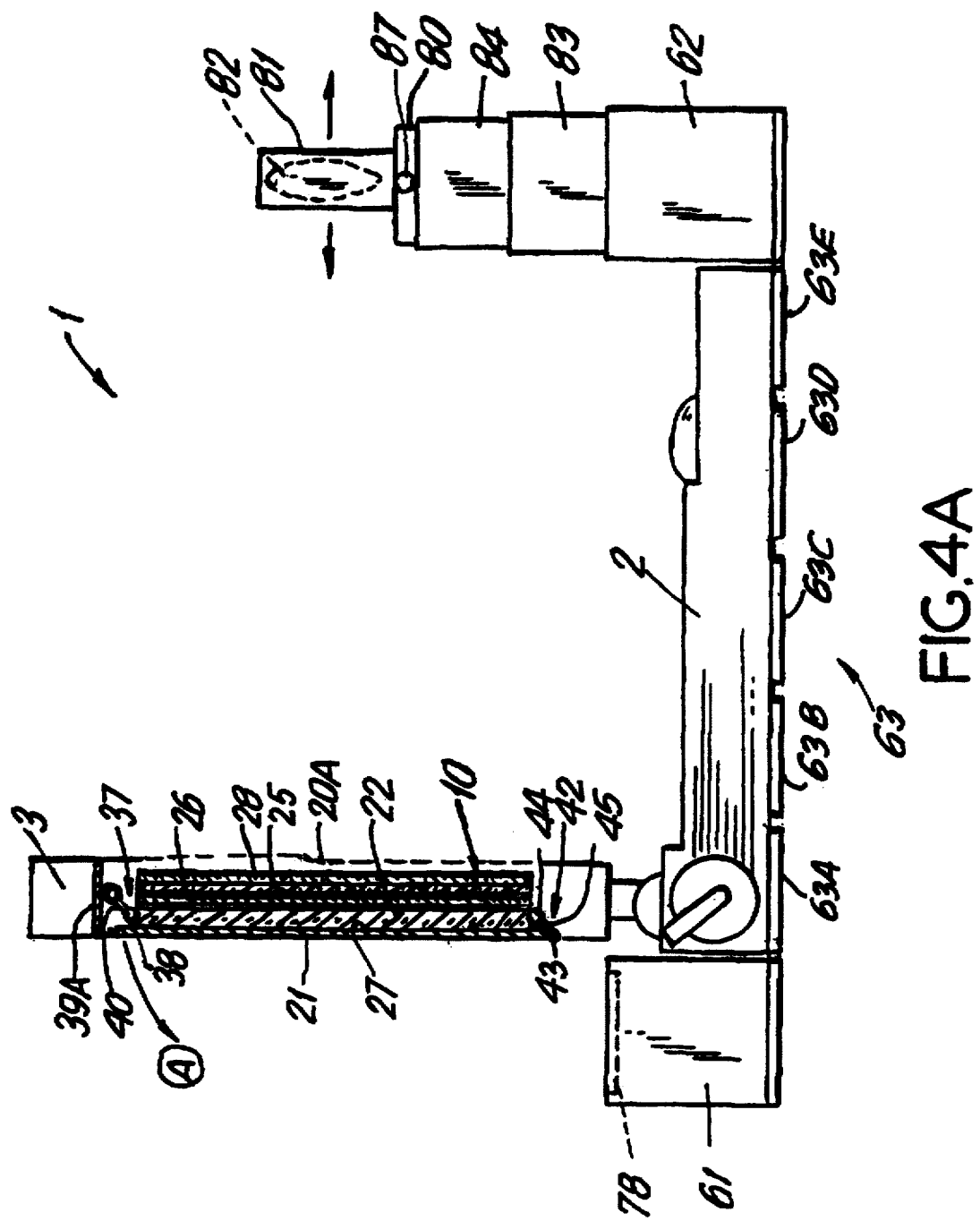
FIG. 4A is an elevated side view of the portable computer-based system of the first illustrative embodiment, showing the first step of the method of arranging the computer-based system of the present invention in its projection viewing configuration.

As shown in FIGS. 3 and 3A, light reflective layer 27 is disposed adjacent light diffusing panel 24 during the direct viewing configuration, while light diffusing panel 23 is engages Fresnel lens panel 26. In contrast, light guiding panel 22 and light reflective layer 27 are positioned away from Fresnel lens panel 26 during the projection viewing mode, best shown in FIG. 4C. As illustrated in FIG. 4A, one end of light guiding panel 22 is hingedly connected to the interior of the display panel portion of the computer system housing by way of a double hinge assembly 37. As shown, double hinge assembly 37 comprises a number of subcomponents, namely: a first hinge support element 38 fixedly attached to the end portion of the light guiding panel; a second hinge support element 39 fixedly attached to the interior of the display panel portion of the housing, slightly above the Fresnel lens and LCD panel subassembly; and a rotatable hinge bracket 40 having first and second end portions that are pivotally connected to the first and second hinge support elements, 38 and 39, respectively. Notably, hinge bracket 40 has two axes of rotation about hinge support elements 38 and 39. Also, the length of hinge bracket 40 is sufficient to permit the light guiding panel 22 to swing outwardly away from Fresnel lens panel 26 during the projection viewing mode, and extend slightly beyond the plane of the rear light transmission aperture 20B, as shown in FIGS. 4B and 4C.

As shown in FIG. 4A, the other end of the light guiding panel is hingedly connected to one end of the rear housing panel 21 by way of double hinge assembly 42 so as to permit complete covering of the rear light transmission aperture 40B during the direct viewing mode. As shown in FIG. 4A, double hinge assembly 42 comprises a number of subcomponents, namely: a first hinge support element 43 fixedly attached to the bottom end portion of rear housing panel 21; a second hinge support element 44 fixedly connected to the other end of light guiding panel 22; and a rotatable hinge bracket 45 having first and second end portions that are pivotally connected to the first and second hinge support elements, 43 and 44, respectively. Notably, hinge bracket has two axes of rotation about hinge support elements 43 and 44, and the length of hinge support bracket 45 is sufficient to permit light guiding panel 22 to fold back against light reflective surface 27 in the direct viewing configuration, and against the exterior surface of the rear housing panel in the projection viewing configuration.

In the direct viewing configuration, the light guiding panel 22 and rear housing panel 21 are arranged in a folded configuration within the display panel portion of the computer system housing, as shown in FIGS. 1A and 4A. In this folded configuration, light reflective surface 27 is disposed adjacent first light diffusing panel 23, while light diffusing panel 24 is disposed adjacent the Fresnel lens panel 26. During the direct viewing mode of operation, fluorescent light tubes 29 and 30 produce visible light which is transmitted through light conducting edges 22A and 22B and into the light guiding panel itself, wherein it is totally internally reflected between the first and second light guiding surfaces thereof. Light extracting pattern 34 scatters the light rays internally reflected within the light guiding panel, and as such, a certain percentage of these scattered light rays are no longer satisfy the conditions for total internal reflection within the light guiding panel. Consequently, these scattered light rays are permitted to pass or leak through the first light guiding surface of the light guiding panel, the Fresnel lens panel and eventually active-matrix LCD panel, at which the light rays are spatially modulated and spectrally filtered in a conventional manner.

Figure 4B:
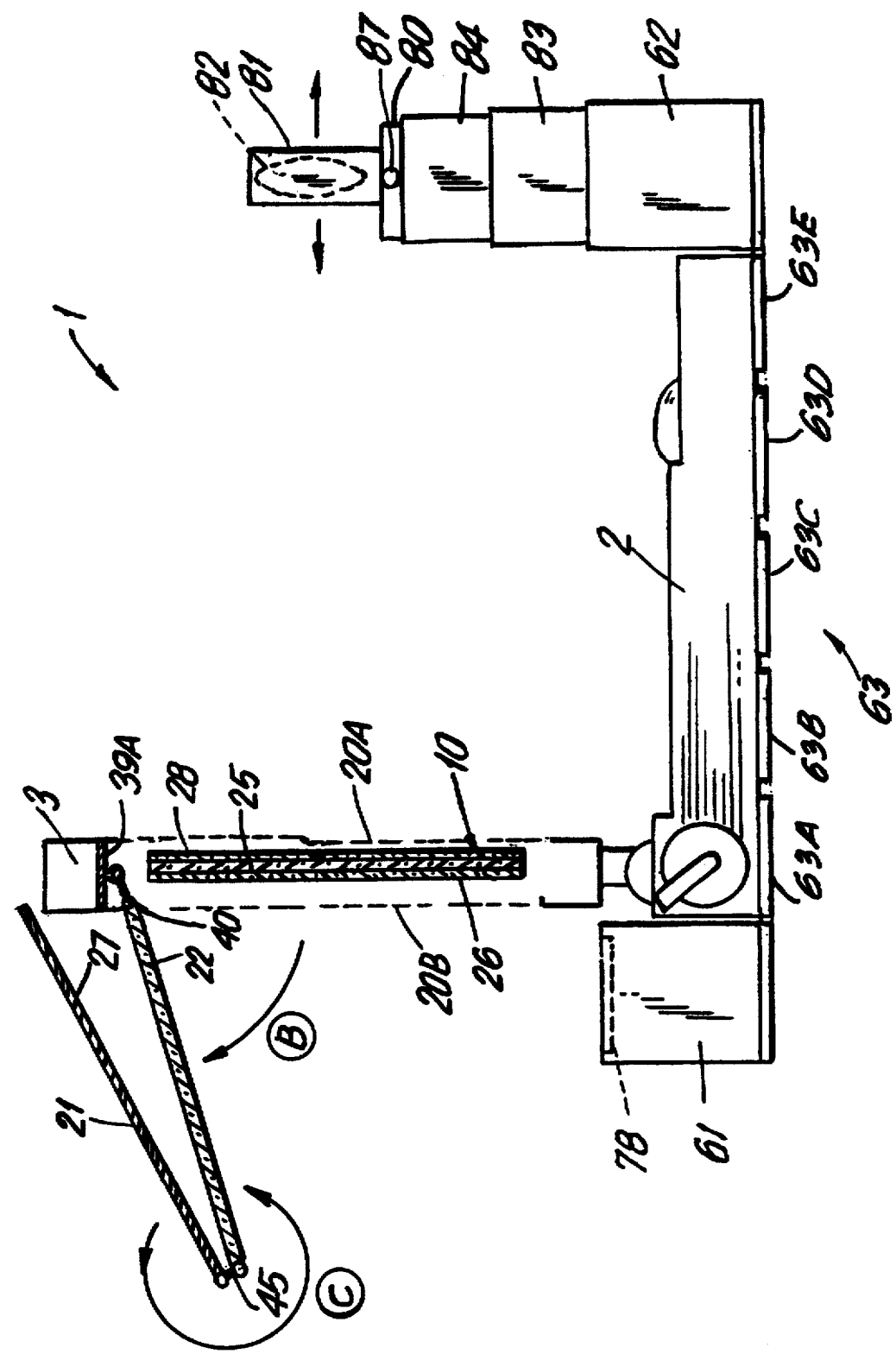
FIG. 4B is an elevated side view of the portable computer-based system of the first illustrative embodiment, showing the second step of the method of arranging the computer-based system of the present invention in its projection viewing configuration.
Figure 4C:
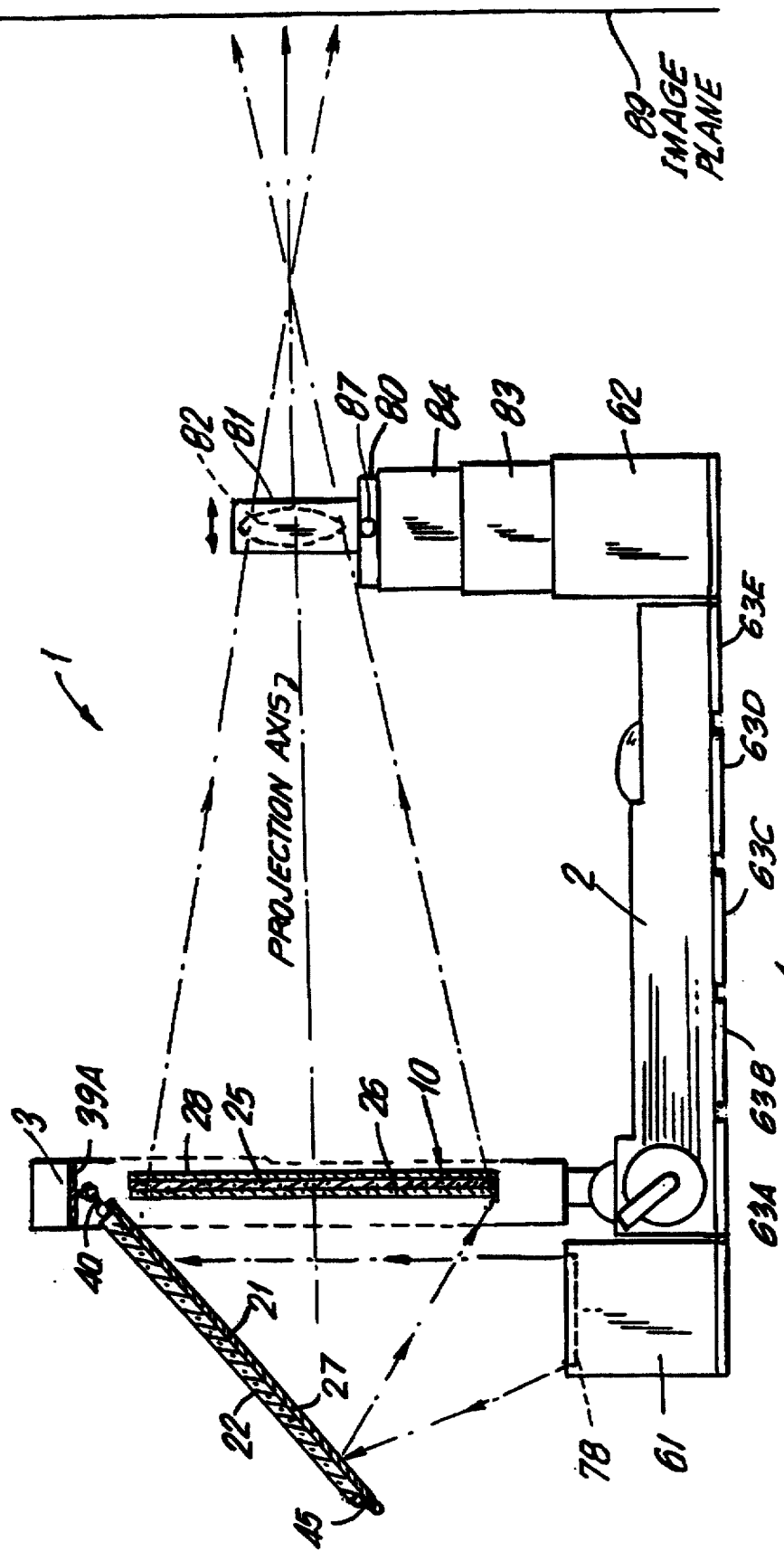
FIG. 4C is an elevated side view of the portable computer-based system of the first illustrative embodiment, showing the third step of the method of arranging the computer-based system of the present invention in its projection viewing configuration.

As shown in FIGS. 4A through 4C, during the projection viewing mode, light guiding panel 22 and rear housing panel 21 are reconfigured in a folded manner so that the light extraction pattern 34 on the light guiding panel is disposed behind light reflective surface 22 out of the optical path of the system, while light guiding panel 22 and rear housing panel 21 are together supported about 45 degrees from the plane of the rear light transmission aperture 20B. During the projection viewing mode of operation, light is preferably not produced from the fluorescent light tubes 29 and 30, but rather is produced and projected from external light source 60 towards light reflective surface 27. Thereafter, the reflected light rays are focused through the Fresnel lens panel 26 and spatially modulated and spectrally filtered while passing through LCD panel 25. Then, the optically processed light rays are focused through an external projection lens 82 disposed in front of the LCD panel so as to form an image projected onto a viewing surface 89 disposed at a preselected distance from the projection lens.

Notably, in either of the viewing modes of operation, the light guiding panel is neither removed or disassembled from the display panel assembly of the computer system. Instead, the light guiding panel is simply reconfigured with respect to light reflective surface 27 formed on rear housing panel 21, by performing a sequence of simple folding operations illustrated in FIGS. 4A to 4C.

As illustrated above, the collective function of light guiding panel 22 and light diffusing panels 23 and 24 during the direct viewing mode of operation is to produce a plane of backlighting having a highly uniform light intensity characteristics along the x and y coordinate directions of LCD panel 25. In order to display imagery of one sort or another from the computer system, LCD panel 25 spatially modulates the intensity of the plane of uniform backlighting as it propagates through the LCD panel. In the illustrative embodiments, LCD panel 25 comprises a programmable spatial color mask (i.e. spatial spectral mask) disposed over a programmable spatial light intensity mask (i.e. spatial light modulator or SLM). In general, the programmable spatial light mask comprises a first array (i.e. matrix) of electrically addressable pixels, and the programmable spatial color mask comprises a second array of electrically addressable pixels. In a manner well known in the art, each pixel in the programmable spatial light mask is formed from a material having a light transmittance (over the optical band) which can varied in accordance with pixel intensity information to be displayed. In a conventional manner, each pixel in this spatial light mask is driven by pixel driver circuitry 11 operated under the control of display controller 13. The degree to which the light transmittance of each pixel in the array is modulated, is determined by the gray-scale or intensity information contained in the corresponding pixel location in frame buffer 12. The gray scale information of a particular image to be displayed is written in frame buffer 12 by display processor 13, and is scanned and converted into pixel drive signals by the pixel driver circuitry 11.

When color images are to be displayed, the programmable spatial color (i.e. spectral) mask is actively driven by pixel driver circuitry 11. Each pixel in the programmable spatial color mask has spectral transmittance characteristics which can varied in accordance with color information to be displayed. In a conventional manner, each of the pixels in the programmable spatial color mask is driven by designated driver lines of X and Y pixel drivers 11. The spectral transmittance characteristics of each pixel in the array are determined by the pixel color information in frame buffer 12.

Figure 4D:
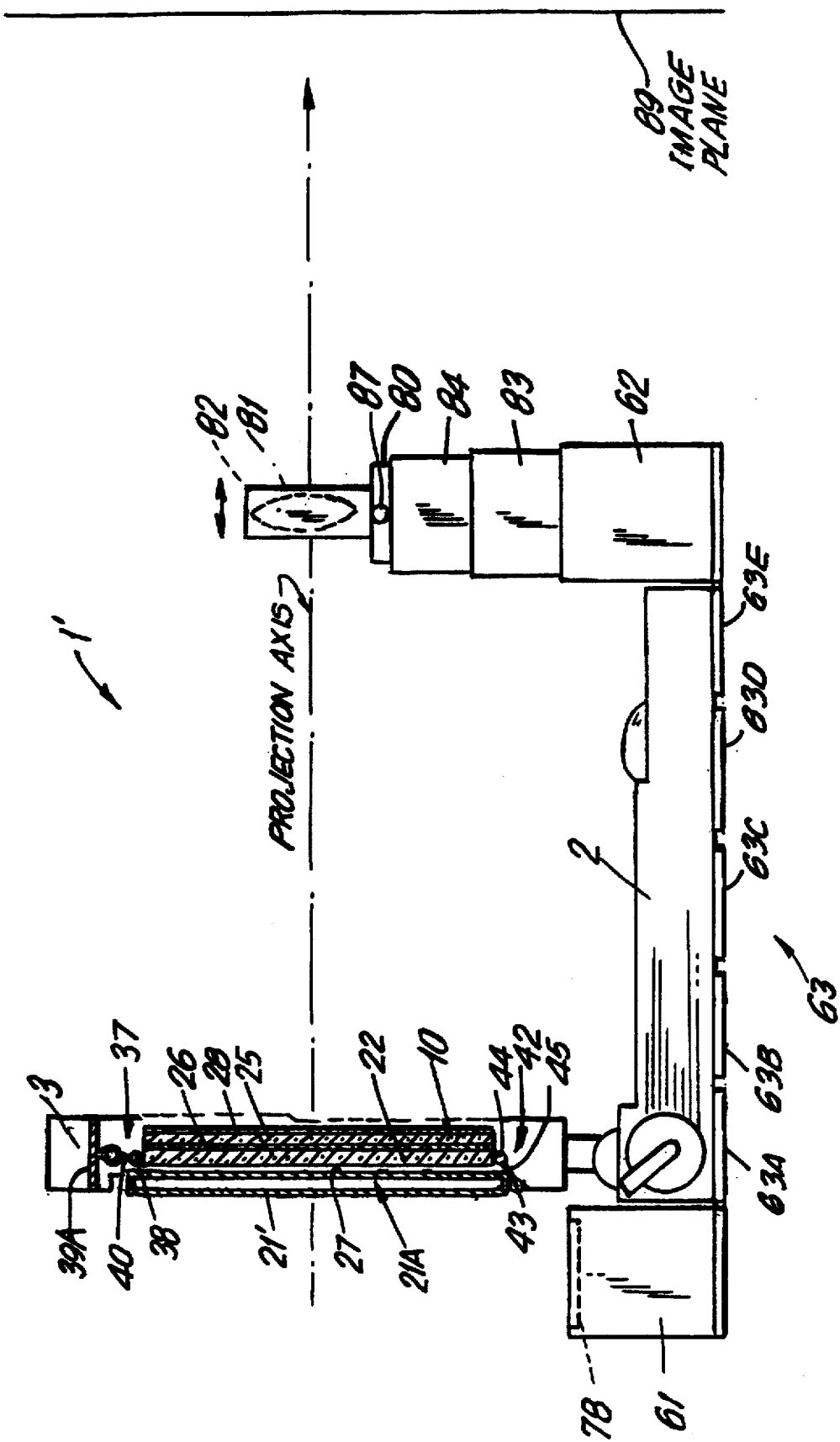
FIG. 4D is an elevated side view of the portable computer-based system of the second illustrative embodiment, realized by modifying the first illustrative embodiment to contain printed circuit boards and electronic components in a cavity formed within the rear housing panel of the system.

In FIG. 4D, there is shown a modified embodiment of the portable computer-based system of FIGS. 4A to 4C, indicated by reference numeral 1'. The primary difference with this embodiment is that it includes a rear housing panel 21' having an interior cavity 21A of sufficient volumetric extent suitable for mounting printed circuit boards and electronic components therein. With this mounting technique, it is possible to reduce the size of the housing base portion, and in some embodiments of the present invention, eliminate the housing portion altogether, while permitting maximum display area.

Having described the illustrative embodiments of display panel assembly of the present invention, it is appropriate at this juncture to now describe in greater detail the portable light projection device of the present invention. Thereafter, various methods of using the same with the computer-based systems hereof will be described.

As shown in FIGS. 6A to 8, the first illustrative embodiment of the portable light projection device of the present invention 60 comprises a number of structural components, namely: first and second housing portions 61 and 62; and foldable structure 63. As shown in its compact storage configuration in FIG. 6A, first and second housing portions 61 and 62 are releasably joined at their ends in a snap-fit manner. As shown in its partially extended configuration in FIG. 6B, the first and second housing portions are shown interconnected by foldable structure 63. In the illustrative embodiment, first and second housing portions 61 and 62 each have a cubical geometry, while foldable structure 63 is realized as a plurality of hingedly connected panels 63A to 63E. As shown, each panel is hinged to at least one other panel, and one panel is hinged to the bottom of the first housing portion, and another panel is hinged to the bottom of second housing portion. These panels can be folded upon each other in sequence, and then the upper rim 65 of first housing portion connected to the upper groove 66 formed in the second housing portion, as shown in . When the portable light projection device is needed for the projection viewing mode, the first and second housing portions can be separated and the panels unfolded so that the housing portions are separated by a distance substantially equal to the width of the base of the computer system, as shown in FIG. 4A.

While the portable light projection device described above has a foldable arrangement, it is understood that many other possible configurations and arrangements of the device are possible and will readily occur to those skilled in the art upon reading the present application.

Figure 7:
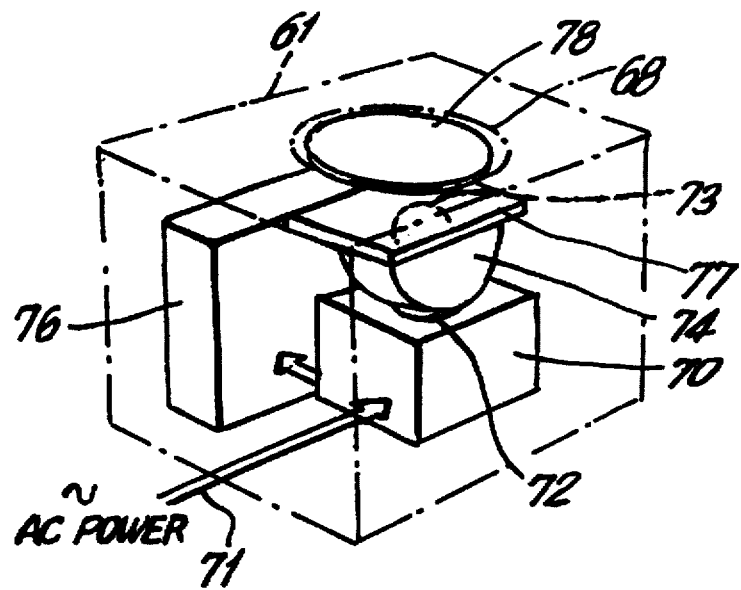
FIG. 7 is a schematic diagram of the first housing portion of the portable light projecting device of the present invention, showing various subcomponents contained within this portion of the device.

As shown in FIG. 7, first housing portion 61 preferably contains electrical power circuitry 70 for transforming standard household AC power (60 Hz), supplied over electrical wiring 71, to a sufficient level of DC power. However, in other embodiments, electrical power circuitry 70 (e.g. transformer, rectifier, converters, filter, etc.) may be housed in a remote structure associated with a standard electrical plug, in a manner known in the art. Mounted above this circuitry is an electrical socket 72 within which is mounted an incandescent lamp 73. About the lamp is a parabolic light focusing reflector 74. Electrical socket 72 and an ON/OFF switch 75 externally mounted through the side wall of the first housing portion are connected to electrical power circuitry 70. An internal fan unit 76 is connected to electrical power circuitry 70 for maintaining the temperature of the lamp at a safe operating level. Mounted above the light focusing reflector 74 is a polarizing filter panel 77 which polarizes the light produced from lamp. Preferably, polarization filter 77 is manufactured from cholesteric liquid crystal(CLC) material, as disclosed in U.S. Pat. No. 5,221,982 to Applicant, which is incorporated herein by reference. While polarizing filter 77 is shown in the form of a panel, the function which it achieves can be realized in a material applied as a coating over a high-intensity/high-efficiency light bulb 73 known in the art. Significantly, the installation of polarizing filter 77 in the portable light projection device avoids dissipating the power of the undesired polarization component across LCD panel 25 of the LCD panel assembly. Consequently, when operated in its projection viewing mode, the display panel assembly of the present invention is permitted to operate a lower temperatures without need for cooling or display-panel temperature control measures in the portable computer system.

Above the light polarizing panel 77, and below light aperture 68 in housing 61, is an adjustable optics assembly 78 for projecting produced polarized light onto the light reflective surface of the rear housing panel, for subsequent focusing through Fresnel lens panel 26 and LCD panel 25 at the position of the principal plane of the exterior projection lens. Optics assembly 78 includes a lens system mounted in housing portion 61 in a conventional manner. Preferably, slidable lens mounts are used to support the lenses of this system in a manner that permits adjustment of the focal length thereof simply by rotation of knob 69, external to housing portion 61. Notably, projection lens 82 may be associated with auto-focusing and zoom lens mechanisms which can be adjusted either manually or automatically in a manner well known in the art.

Figure 6A:
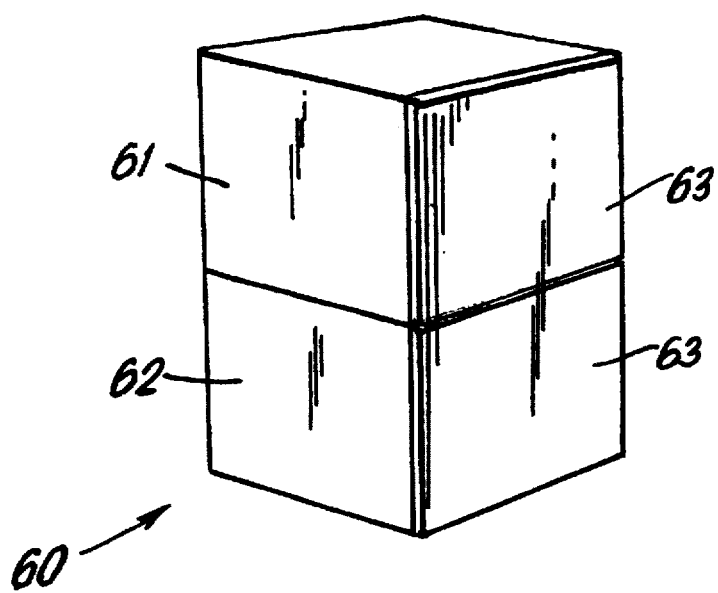
FIG. 6A is a perspective view of the portable accessory device of the present invention, shown arranged in its compact storage configuration.
Figure 6B:
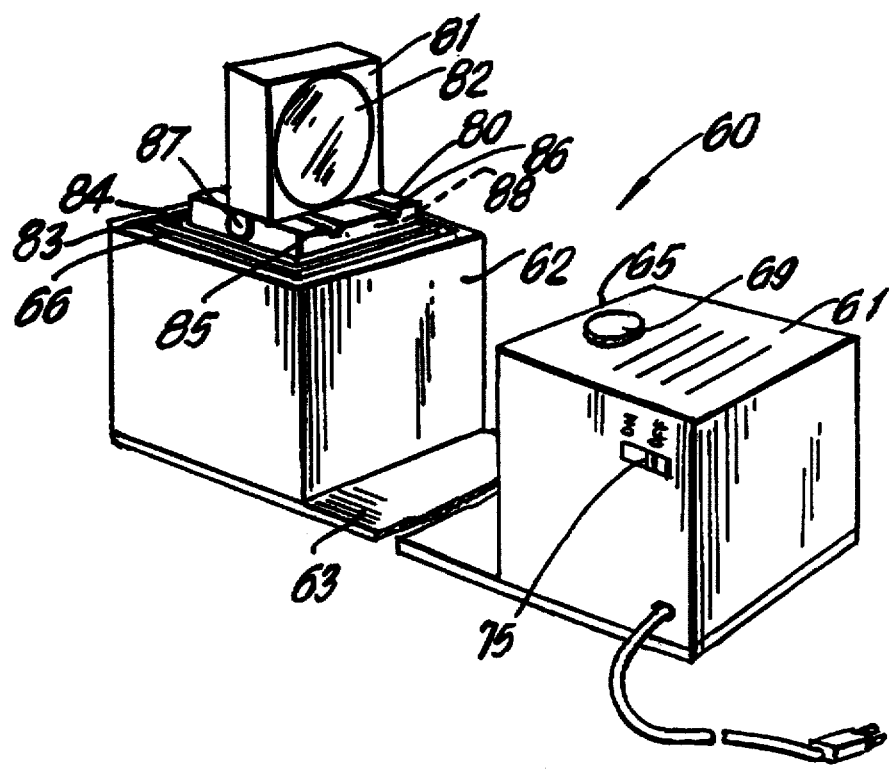
FIG. 6B is a perspective view of the portable light projection device of the present invention, shown partially extended but not completely arranged in its light projecting and image focusing configuration.
Figure 8:
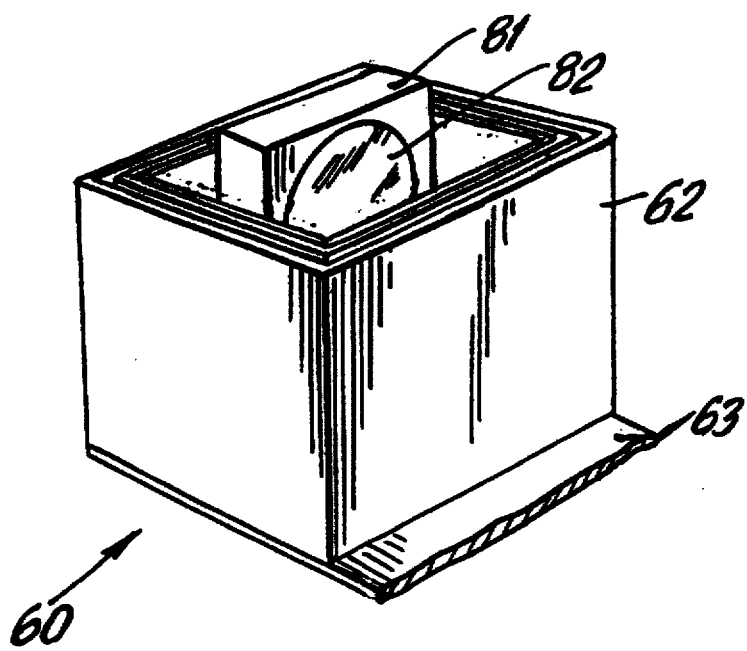
FIG. 8 is a perspective view of the second housing portion of the portable light projecting device of the present invention, showing the various subcomponents contained within this portion of the device.

As shown in FIG. 6B and 8, the second housing portion 62 contains an optical platform 80, a lens holder 81, light projection lens 82, and first and second platform support sleeves 83 and 84. As shown in FIG. 4A, platform 80 is mounted upon the top portion of platform support 82, whereas platform support sleeves 83 and 84 are telescopically interconnected and joined to the cubic shaped second housing portion 62. As shown in FIGS. 4A and 6B, lens holder 81 is slidably mounted within grooves 85 and 86 formed in optical platform 80 such that the position of lens holder 81 along the optical platform can be easily adjusted by simply rotating a knob 87. In the preferred embodiment, knob 87 is operably associated with a platform translation mechanism 88 contained beneath optical platform 80 itself. Within lens 81, image projection lens 82 is securely mounted. With the above described arrangement, image projection lens 82 can be adjustably positioned with respect to LCD panel 33 in order to project a focused video image onto a desired viewing surface.

A method of using portable light projection device 60 with portable computer system 1 will be described below.

In FIGS. 4 and 4A, portable computer system 1 is shown arranged in the projection viewing configuration using portable light projection device 60. The projection viewing configuration is achieved by arranging the portable light projecting device in its extended configuration, about base portion 2 of the computer system, as shown. Hinged rear housing panel 21 is pulled outwardly away from Fresnel lens panel 26 and reconfigured with respect to light guiding panel 22 so that light guiding panel and light reflective surface 27 are together supported at about a 45 degree position with respect to Fresnel lens panel 26, as shown in FIG. 4C. Any suitable support mechanism can be used to support the light guiding panel and rear housing panel in this position. In the projection viewing configuration, the first housing portion 61 of the portable light projecting device is disposed below the reflective surface, while an image projection lens 62 extends from the second housing portion 63.

Once configured as shown in FIG. 4A, portable light projection device 60 is adjusted as follows. First, the lateral position of first housing section 61 is adjusted so that the optical axis of projection lens 78 in the first housing portion is aligned under light reflective surface 27. Lens holder 81 is then pulled upwardly out of the frictional embrace of the second platform support sleeve 84, as shown in FIG. 6B. Then by pulling further upwardly, the second platform support sleeve 84 slides out of the frictional embrace of the first platform support sleeve 83 and then when further pulled upwardly, the first platform support sleeve slides out of the frictional embrace of the cubic shaped second housing portion, as shown in FIG. 4A. Then, with power supplied to light source 73 and light emitting therefrom, the position of projection lens 82 along the optical axis of Fresnel lens panel 26 is adjusted so that the images formed on the display surface of LCD panel 25 are projected as enlarged focused images onto large viewing surface 89. In general, projection lens 82 is positioned in front of the display panel assembly at a distance equal to the focal length of Fresnel lens panel 26.

Figure 5:
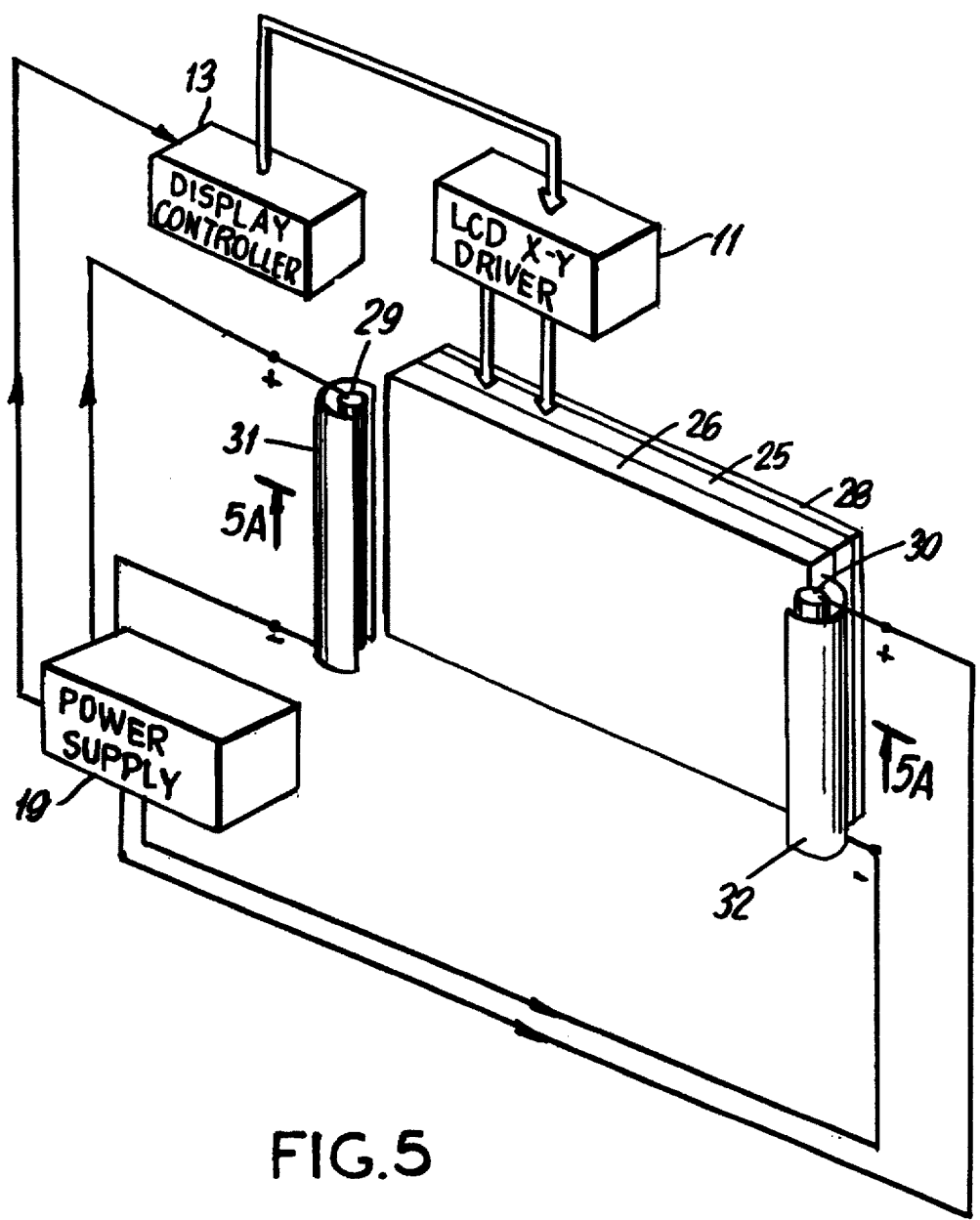
FIG. 5 is a schematic representation of the image display subsystem of the portable computer system of the first illustrative embodiment, shown in its projection viewing configuration.
Figure 5A:
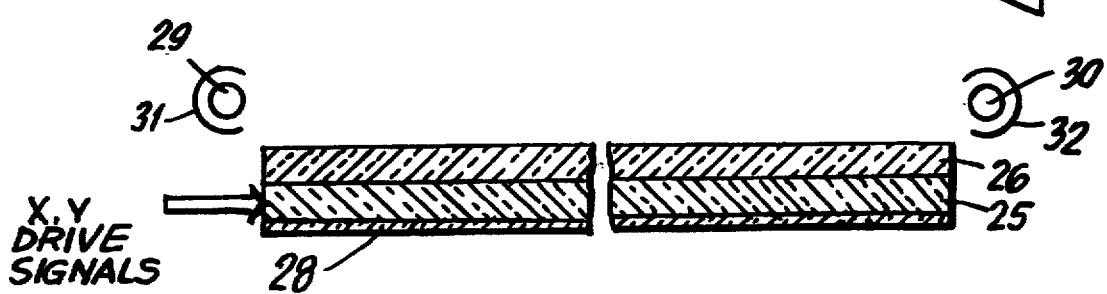
FIG. 5A is a cross-sectional view of the image display panel assembly of the first illustrative embodiment, taken along line 5A—5A of FIG. 5.

When it is desired to arrange portable light projecting device 60 back into its compact storage configuration, as shown in FIG. 6, lens holder 81 is simply pushed downwardly, to collapse platform support sleeves 83 and 84 into each other in a manner opposite to the telescopic extension process described above. Thereafter, hingedly connected panels 63A to 63E are folded upon each other and finally first housing portion 61 is snap-fit connected to second housing portion 62, to provide a single interconnected unit of physical dimensions of 3"×3"×6", as shown in FIG. 6A The geometrical optics that describe the image projection process are graphically illustrated in FIG. 4A. Specifically, during the projection viewing mode, the light rays produced from light source 73 in the first housing portion are first polarized by polarizer 77, and then focused in a divergent manner onto light reflective surface 27 by projection lens 78. The polarized light rays are then reflected off light reflective surface 27, focused by Fresnel lens panel 26 and optically processed by LCD panel 25. The light rays emanating from actively driven LCD panel 25 are spatial intensity modulated and spectrally filtered in accordance with the X,Y drive signals provided to pixel driver circuitry 11, and are then polarization encoded by micropolarization panel 28 and subsequently focused by projection lens 82 to produce a focused video image on viewing surface 89, which is typically located at the focal distance of projection lens 82. The structural details of the display panel subassembly when configured for the projection viewing configuration, are shown in FIGS. 5 to 5A.

In either mode of viewing, the portable computer system 1 described above is capable of displaying polarized spatially multiplexed images of 3-D objects for stereoscopic viewing thereof. In portable computer system 1, the combined function of LCD panel 25 and micropolarization panel 28 is to polarize and display spatially multiplexed images of a 3-D object for stereoscopic viewing through a pair of polarized glasses 101 worn by viewers thereof. In general, each polarized SMI displayed from the display panel assembly hereof is a composite pixel pattern composed of first and second spatially modulated perspective images of the 3-D object. The first spatially modulated perspective image consists of a first pixel pattern that is representative of a first perspective image of the object and spatially modulated according to a first spatial modulation pattern. The second spatially modulated perspective image consisting of a second pixel pattern that is representative of a second perspective image of the object and spatially modulated according to a second spatial modulation pattern. The second spatial modulation pattern is the logical complement of the first spatial modulation pattern.

Details regarding the manufacture of micropolarization panel 28 are disclosed in copending U.S. application Ser. No. 07/536,419 entitled "Methods for Manufacturing Micro-Polarizers" filed on Jun. 11, 1990. Methods and apparatus for producing spatially-multiplexed images of 3-D objects are disclosed in copending U.S. application Ser. Nos. 08/126,077 entitled "Method and Apparatus for Recording and Displaying Spatially Multiplexed Images of 3-D Objects for Stereoscopic Viewing Thereof" filed Sept. 23,1993; and 07/976,518 entitled "Method and Apparatus for Producing and Recording Spatially-Multiplexed Images for Use in 3-D Stereoscopic Viewing Thereof" filed Nov. 16, 1992. Each of these copending applications by Applicant is incorporated herein by reference in its entirety.

Figure 11:
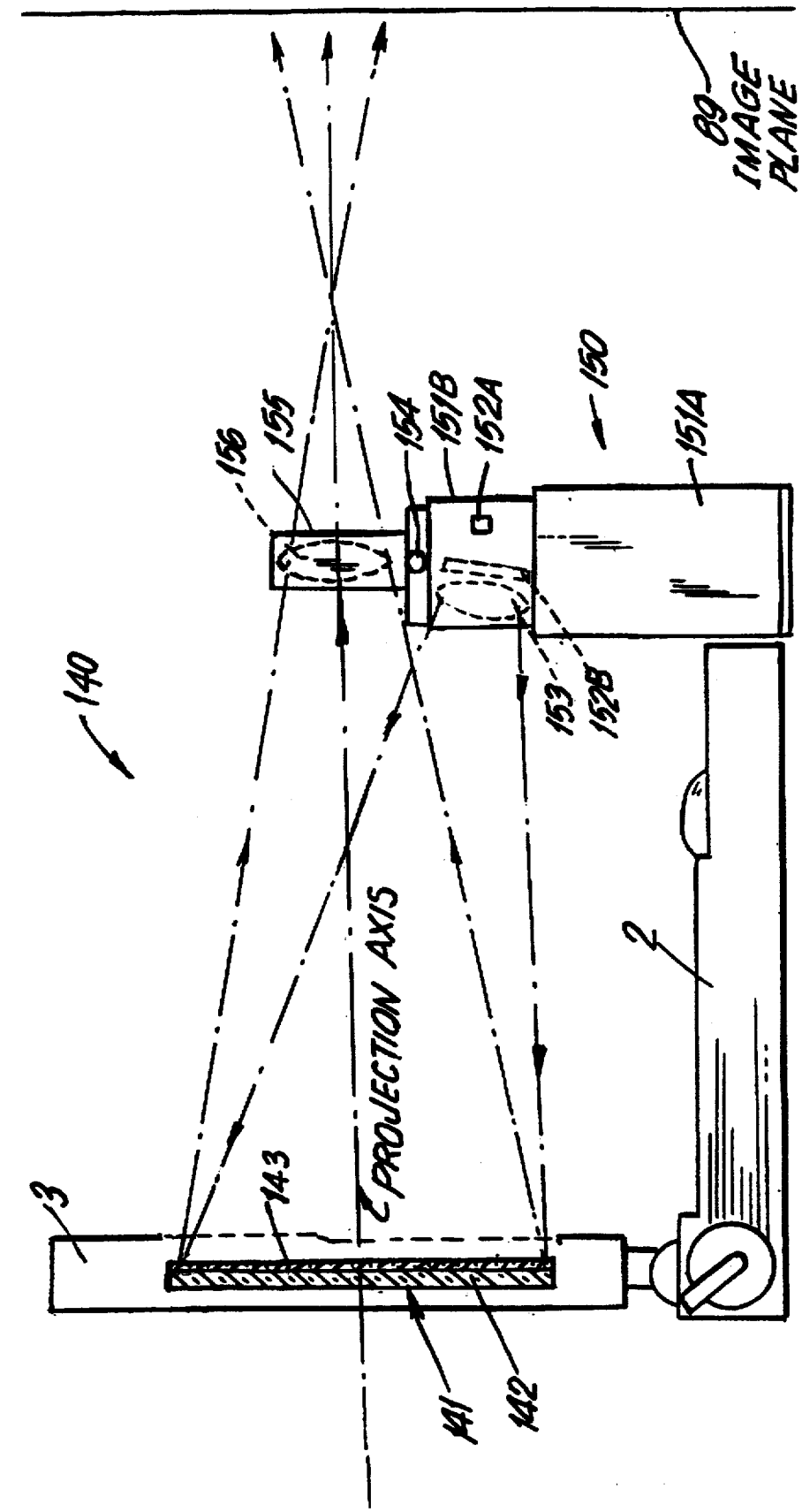
FIG. 11 is an elevated side view of the portable computer-based system of the five illustrative embodiment, showing the computer-based system arranged in its projection viewing configuration.

As best shown in FIGS. 11 and 11A, each spatially-multiplexed image displayed from LCD panel 25 is optically processed by micropolarization panel 28. In the illustrative embodiment, micropolarization panel 28 is realized as a optically transparent sheet directly mounted onto the display surface of LCD panel 25. Permanently formed within the optically transparent sheet are first and second optically transparent patterns. The first optically transparent pattern spatially corresponds to and is spatially aligned with the first pixel pattern in the displayed spatially multiplexed image. The function of the first optically transparent pattern is to impart a first polarization state $P_1$ to the radiant energy (i.e. light) associated with the first pixel pattern. The second optically transparent pattern spatially corresponds to and is spatially aligned with the second pixel pattern in the displayed spatially-multiplexed image. The function of the second optically transparent pattern is to impart a second polarization state $P_2$ to the radiant energy (i.e. light) associated with the second pixel pattern. Importantly, the second polarization state $P_2$ is different than the first polarization state $P_1$ so that encoded perspective images are simultaneously displayed from polarization panel 28 with optically different polarization states.

Figure 9:
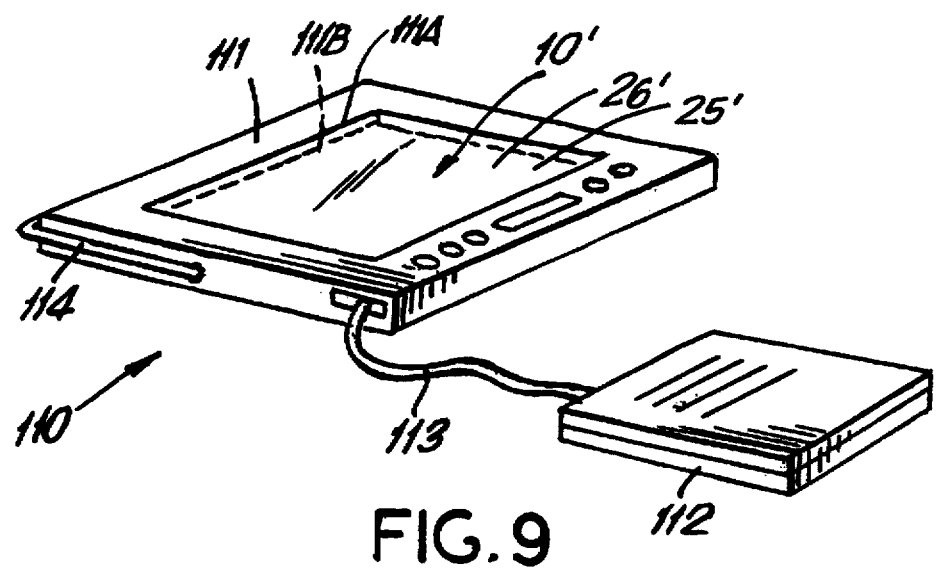
FIG. 9 is a perspective view of a second illustrative embodiment of the computer-based system of the present invention realized in the form of a portable image display device of the present invention being used to directly view imagery recorded in a film structure (e.g. film slide) while operated in its backlighting mode.
Figure 9A:
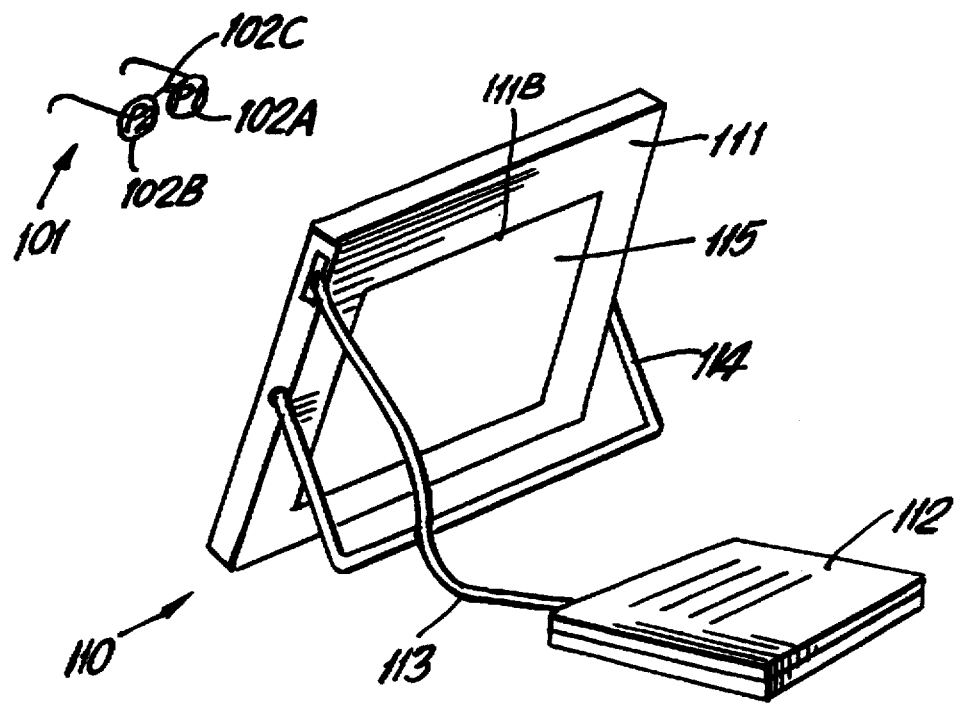
FIG. 9A is a perspective view of the image display device of FIG. 9, shown interfaced with a conventional computer system while being operated in its direct viewing mode.
Figure 10:
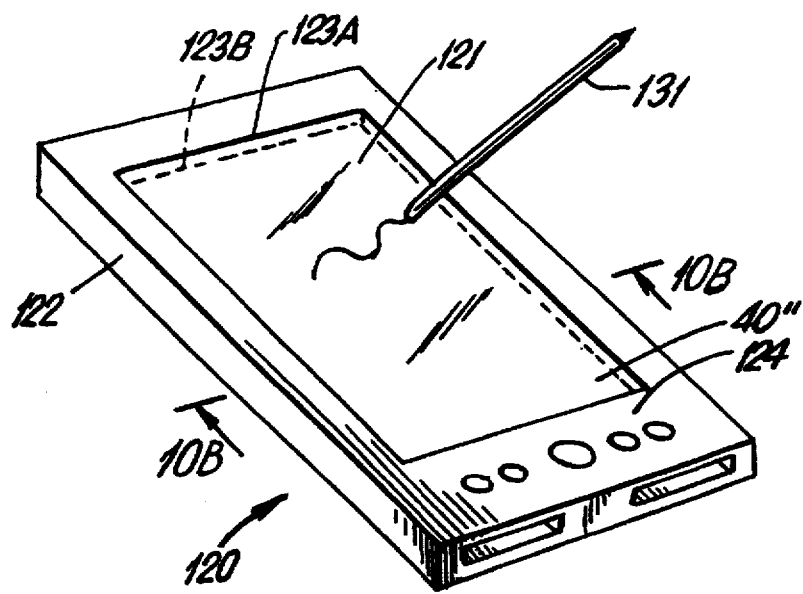
FIG. 10 is a perspective view of the portable pen-computing device of the present invention, shown being used in its pen-type data entry mode of operation, and direct viewing modes of operation.
Figure 10A:
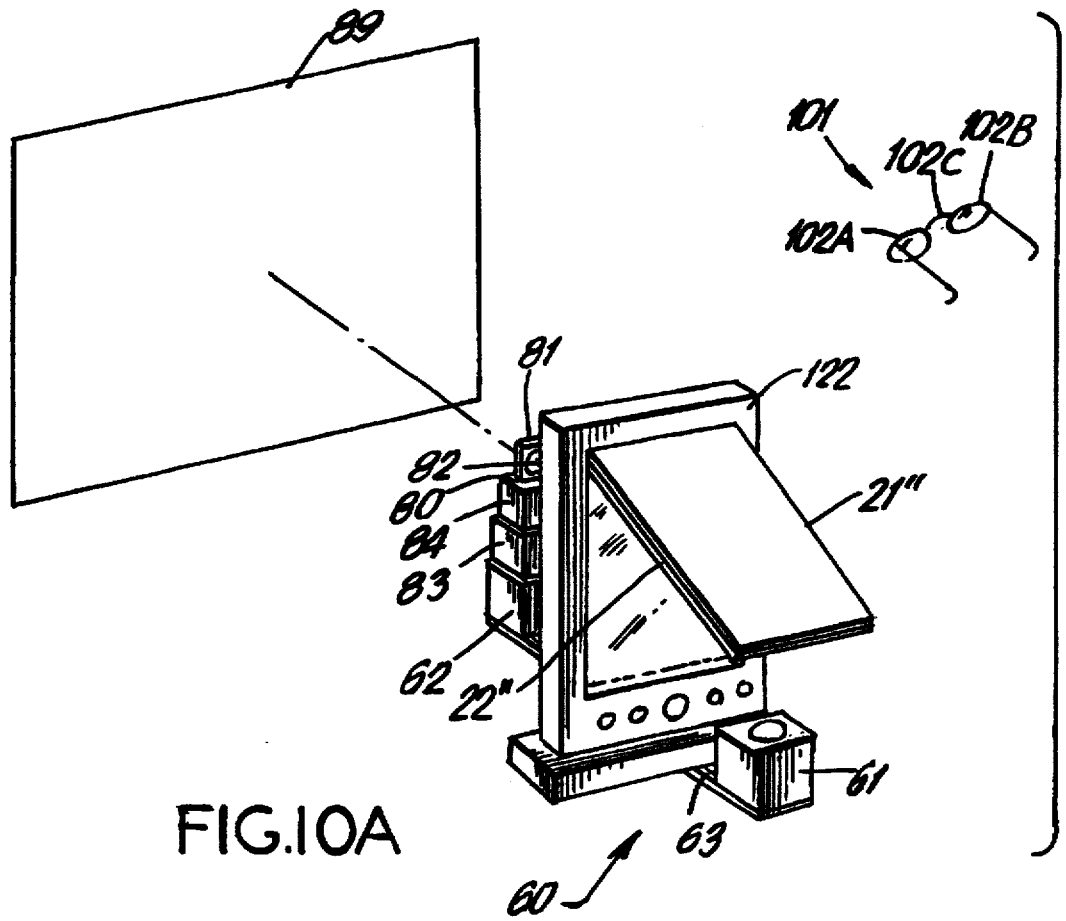
FIG. 10A is a perspective view of the portable pen-computing device of the present invention, shown being operated in its projection viewing mode.

As shown on FIGS. 1A, 9A and 10A, optically-transparent polarizing lenses 102A and 102B are mounted within the frame 102C of polarized glasses 101. During stereoscopic viewing of images displayed or projected from computer system 1, the viewer wears polarized glasses 101 as he or she would wear conventional eyeglasses. When worn on a viewer's head, polarizing lens 102A is positioned adjacent to the left eye of a viewer, while the second optically transparent element 102B is positioned adjacent to the right eye of the viewer. Polarizing lens 102A is characterized by the first polarization state $P_1$ so as to permit the left eye of the viewer to view the first spatially modulated perspective image displayed from the micropolarization panel, while substantially preventing the left eye of the view from viewing the second spatially modulated perspective image displayed from the micropolarization panel. Polarizing lens 102B is characterized by the second polarization state $P_2$ so as to permit the right of the view to view the second spatially modulated perspective image displayed from the micropolarization panel, while substantially preventing the right eye of the viewer from viewing the first spatially modulated perspective image displayed therefrom. This way, the viewer is capable of 3-D stereoscopic viewing of the 3-D object without "cross-viewing" from adjacent visual channels established by the stereoscopic imaging scheme.

Using the above-described spatial-multiplexing technique and display panel assembly of the present invention, portable computer system 1 can directly-display or project polarized spatially-multiplexed images of 3-D objects for stereoscopic viewing through polarized glasses 101 which can be readily adapted to the aesthetics of the viewer.

In any embodiment of the present invention disclosed herein, selection of a viewing mode command (e.g. Direct Viewing Mode or Projection Viewing Mode) can be made by way of either a keyboard entry operation, or by selecting the command or its graphical icon in a pulled-down menu supported by either the Macintosh System 7.5 operating system, the Microsoft Windows operating system, or like operating system. Alternatively, Viewing Modes can be selected by actuating designated switches accessible through the system housing.

Figure 9B:
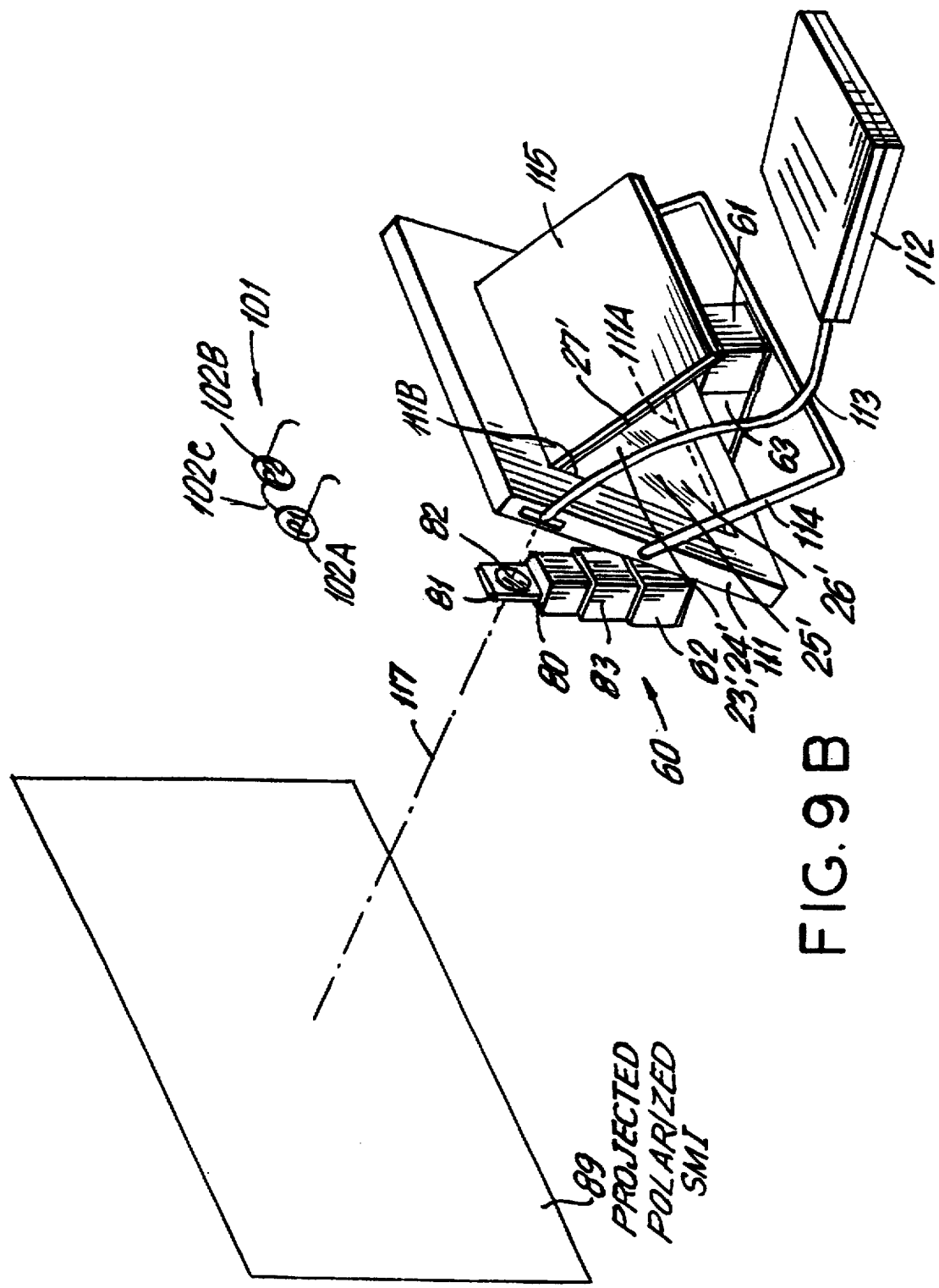
FIG. 9B is a perspective view of the image display device of FIG. 9, shown interfaced with a conventional computer system while being operated in its projection viewing mode.

As shown in FIGS. 9 to 9B, the portable computer-based system of the present invention can be realized as a portable image display system 110 incorporating the display panel construction of the present invention, modified only in terms of physical dimensions in order to fit within the housing of the computer-based image display system. As best illustrated in FIG. 9, image display system 110 includes a picture-frame shaped housing 111 having light transmission apertures 111A and 111B, through which the display panel construction of the present invention is securely mounted. Preferably, the system components shown in FIG. 2, or their functional equivalents are mounted within portable housing 111, beyond the purview (i.e. along the borders) of the light transmission apertures. In general, image display system 110 is capable of storing, and even generating frames of color image data, including color SMIs. However, for illustration purposes, image display system 110 is shown in the drawings as being interfaced with an auxiliary computer system 112 by way of a conventional serial data communication cable 113. In the illustrative application, the function of auxiliary computer 113 is to supply color image data (e.g. SMI data) to image display system 110 for display in either its direct viewing mode, shown in FIGS. 9 or 9A, or in its projection viewing mode, shown in FIG. 9B, using a slightly portable light projection device 60 of the present invention.

In FIGS. 9A and 9B, image display system 110 is shown vertically supported on a desktop by way of a stand 114 that is hingedly connected to portable housing 111. As shown in FIG. 9, stand 114 retracts against the side walls of housing 111 during transport or storage. In the direct viewing mode shown in FIG. 9A, rear housing panel 115 and the light guiding panel are configured in a manner similar to that shown in FIG. 3A, with rear housing panel 115 snapped into place over the rear light transmission aperture. In this direct viewing configuration, reflective surface 27' on the interior of the rear housing panel 115 is disposed adjacent light diffusing panel 23', while light diffusing panel 24' is disposed adjacent Fresnel lens panel 26'. In the configuration shown in FIG. 9A, image display system 110 can be used as a backlighting panel for backlighting slides, transparencies, film structures and the like, that is when LCD panel 25' is operated in its light transparent mode (i.e. does not spatially modulate or spectrally filter light passing therethrough). To enter the backlighting viewing mode of operation of the image display system, LCD panel 25' is deactivated and fluorescent tubes 29' and 30' are driven. In this backlighting viewing mode, rear housing panel 21' is snapped in place and a plane of light having a uniform intensity distribution emanates from the display surface of the display panel assembly 10'. The plane of light passes through the slide, film structure or transparency placed over the display surface, and is spatial intensity modulated and spectrally filtered thereby to display imagery graphically represented therein. In essence, the slide, film structure or transparency functions as a non-programmable spatial light mask placed over the backlighting panel of the present invention.

As shown in FIG. 9B, image display system 110 is configured for projection viewing by performing the steps illustrated in FIGS. 4A to 4C, arranging portable light projection device 60 about the housing as shown, and then selecting the Projection Viewing Command, as described above. Once configured as shown in FIG. 9B, power is supplied to light source 73 and the position of projection lens 82 along the optical axis of Fresnel lens panel 26' is adjusted so that the images formed on the display surface of by LCD panel 25' are projected onto viewing surface 89, as enlarged focused SMI images.

Figure 13:
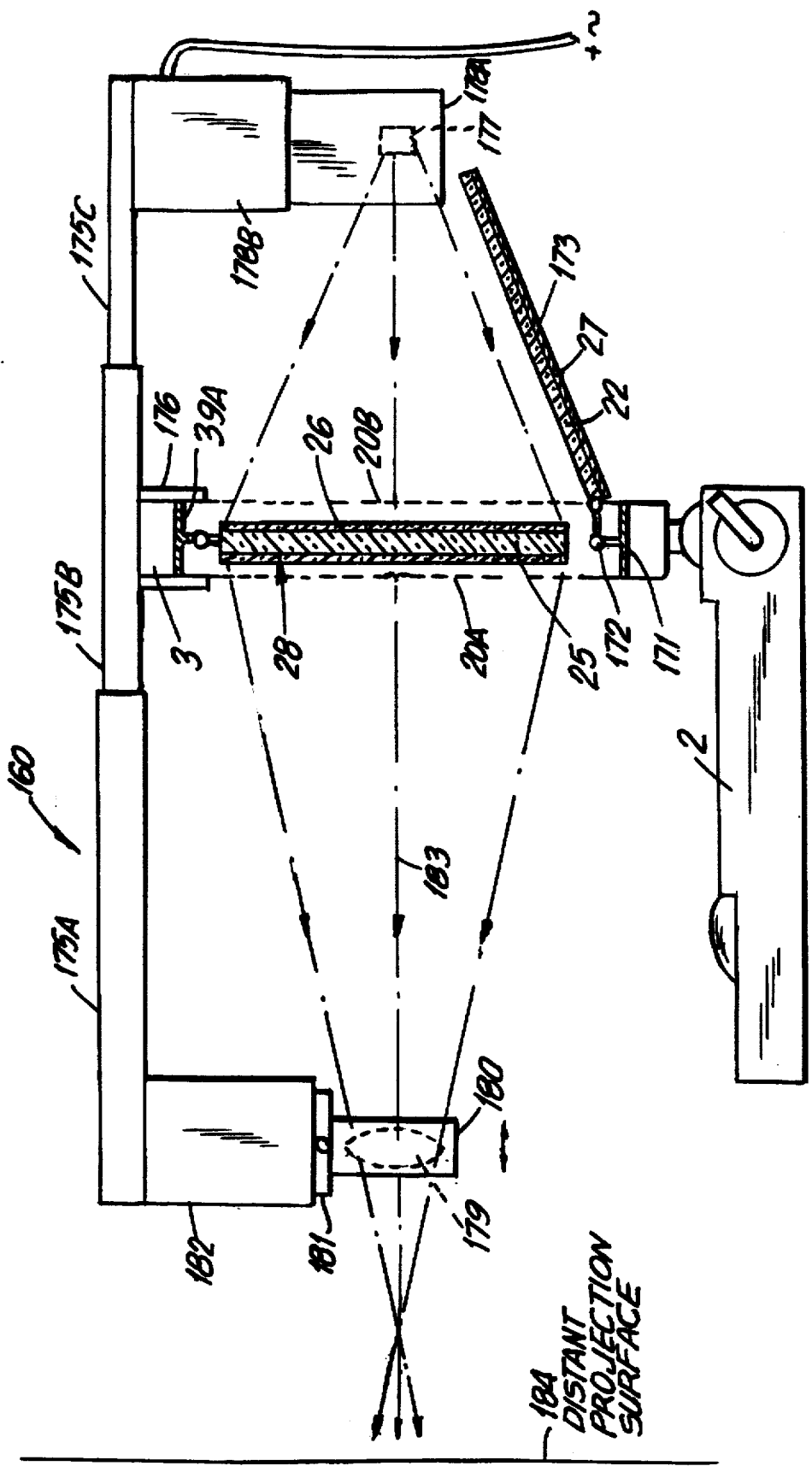
FIG. 13 is an elevated side view of the portable computer-based system of the seventh illustrative embodiment, showing the computer-based system arranged in its projection viewing configuration.

As shown in FIGS. 10 to 10A, the portable computer-based system of the present invention can be realized as a portable pen-computing device. In the illustrative embodiment, portable pencomputing device 120 is a computer-based system having a general system architecture, as shown in FIG. 2. In addition, however, it incorporates the display/touch-screen panel assembly 121 illustrated in FIG. 10B in order to provide the same with a pen-type mode of data entry, and direct and projection modes of stereoscopically viewing 3-D objects. All of these system components are mounted within a hand-supportable housing 122 that has light transmission apertures 123A and 123B through which display/touch-screen panel assembly is supported using conventional display panel mounting techniques known in the art. A rear panel 124 snap-fits into place to cover rear light transmission aperture 123B during the direct viewing mode of operation, shown in phantom in FIG. 13. As shown in FIG. 13B, rear panel 124 supports specularly reflective layer 27".

Figure 10B:
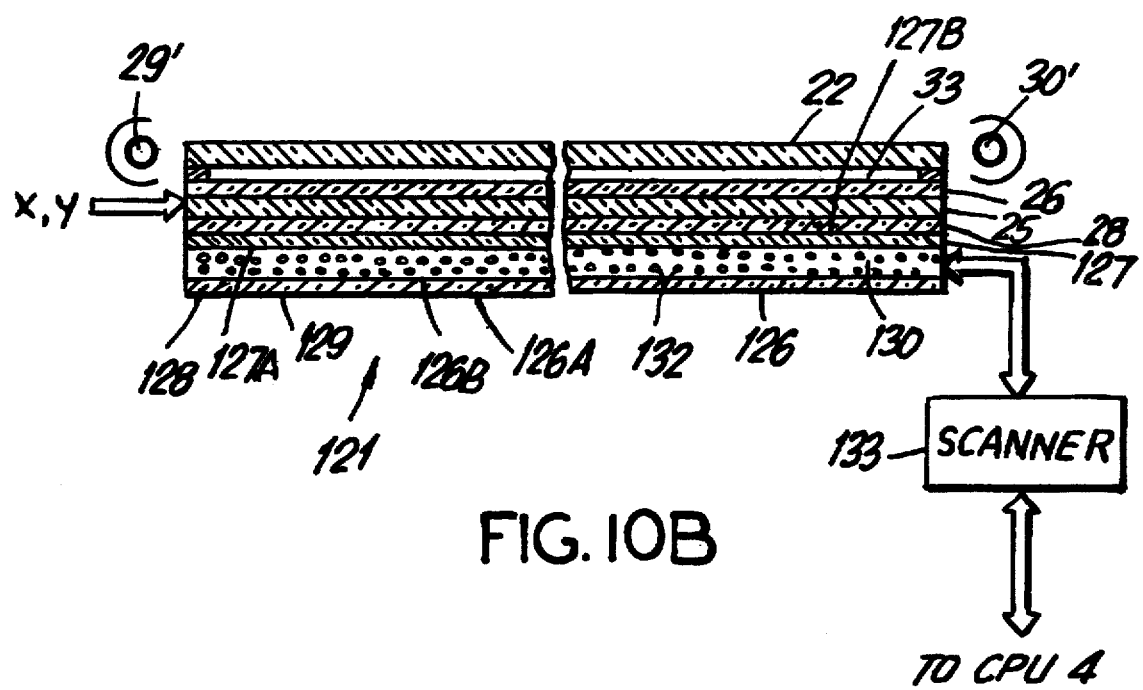
FIG. 10B is a cross-sectional view of the display panel assembly of the portable pen-computing device, taken along line 10A—10A of FIG. 10.

As illustrated in FIG. 10B, optically transparent touch-screen/display panel 121 panel comprises a number of components, namely: the display panel construction of the present invention 10" modified only in terms of physical dimensions in order to fit with hand-supportable housing 122; a writing panel 126 having first and second surfaces 126A and 126B, respectively; a base panel 127 having first and second surfaces 127A and 127B, respectively; a plurality of optically transparent ultra-thin conductive strips 128 applied to the second surface 127A of base panel 127 in a spaced apart manner on the order of inter-pixel spacing of a suitable spatial resolution; an optically transparent conductive layer 129 applied to the second surface 126B of the writing panel; and a non-conductive viscous gel 130 disposed between and electrically isolating the writing panel from the base panel. As shown, the second surface of base panel 127B is directly affixed to the display surface of LCD panel 25" of the display panel assembly. Writing surface 126A is exposed to the ambient environment.

The writing panel 126 is made of flexible optically transparent material, such as Mylar, which elastically deforms in response to the application of pressure on writing surface 126A by, for example, a writing stylus 131 moved thereover during conventional writing operations by its user. Preferably, base panel 127 is made from an optically transparent material such as glass, although other materials may be used without significantly compromised performance. Non-conductive gel 130 contains microscopic spheres 132 made of substantially non-conductive material, such as plastic, and are free to move within non-conductive gel 130 in response to the application of pressure by writing stylus 131.

Each optically transparent conductive strip 128 extends parallel to every other optically transparent conductive strip and each such conductive strip is preassigned a corresponding x-coordinate value along the x-coordinate direction of the 2-D array represented along the writing surface. The y-coordinate direction in the 2-D array extends along each optically transparent conductive strip.

Whenever the stylus is moved over the writing surface, the pressure path formed therealong at each instant in time, elastically deforms the writing surface, and causes the plastic microspheres to move away from under the tip of the writing stylus. This permits a selected one of the optically transparent conductive strips 128 to momentarily establish contact with optically transparent conductive layer 129 and in response to the voltage applied across strips 128 and conductive layer 129, a small electrical current to flows therebetween. A scanning mechanism 133 is operably associated with the conductive strips and conductive layer, to cyclically determine, at each scanning interval, the x-coordinate value associated with the optically transparent conductive strip that establishes contact with the optically transparent conductive layer. The scanning mechanism also measures the small electrical current flow associated with the established electrical contact. Using this small current measure, the scanning mechanism computes the resistance associated with the circuit formed by the point of electrical contact beneath the elastically deformable writing surface. Then, using a preconstructed resistance/y-coordinate look-up table, the computed resistance measure is converted into a corresponding y coordinate value on the writing surface. For each x,y coordinate pair assembled as described above, the processor is able to construct an image data set of the graphical pattern that was traced out on the writing surface over a specified time interval. This image data set is stored in bit-mapped form in memory (e.g. VRAM) for subsequent display using the display panel assembly of the portable pen-computing device of the present invention.

In FIG. 11, the fifth illustrative embodiment of the computer-based system of the present invention is shown. In general, computer system 140 is based on light reflective principles in both direct and projection views. Computer system 140 is similar to computer system 1 in FIG. 1 in many respects. However, there are several structural and functional differences. Firstly, the display panel assembly 141 is realized as a reflective mode LCD panel known in the art, having an ultra-thin light focusing panel (e.g. Fresnel lens panel or holographic lens panel) 142 directly aminated to the front surface thereof. During the direct viewing mode, ambient light is permitted to pass though light focusing panel 143 and LCD panel 142, and becoming spatially modulated upon being reflected towards the viewer's eyes looking at the display surface of the LCD panel. During the projection viewing mode, illustrated in FIG. 11, a modified light projection device 150 is used in conjunction with computer-based system 140. As shown, light projection 150 comprises: a telescopic housing having first and second sleeves 151A and 151B; an intense light source 152 and a first projection lens 153 mounted within second housing sleeve 151B as shown; and an adjustable platform 154 having a lens mount 155 supporting a second projection lens 156 therein. The light projection device can be easily collapsed to the light of housing sleeve 151A by gently pushing down upon lens mount 155. The portable light projection device is arranged for use in the projection viewing mode by simply pulling up on lens mount 155 until housing sleeve 151B is disposed above the top of housing sleeve 151A, as shown in FIG. 11. The function of light source 152 is to produce intense light rays, whereas the function of projection lens 153 is to project the produced light rays onto the display surface of LCD panel 142. As incident light rays are being spatial intensity modulated and reflected towards the light projection device, the light rays are focused by Fresnel panel 143 through projection lens 156 onto a projection screen or wall surface. Notably, in this embodiment of the portable computer-based system, there is no need to transmit light directly through the display panel portion 3 of the housing as in the first illustrative embodiment, and thus there is there is no rear housing panel formed therein. Consequently both the light source and projection lens are disposed on the viewing side of the reflective mode LCD panel 141.

Figure 12:
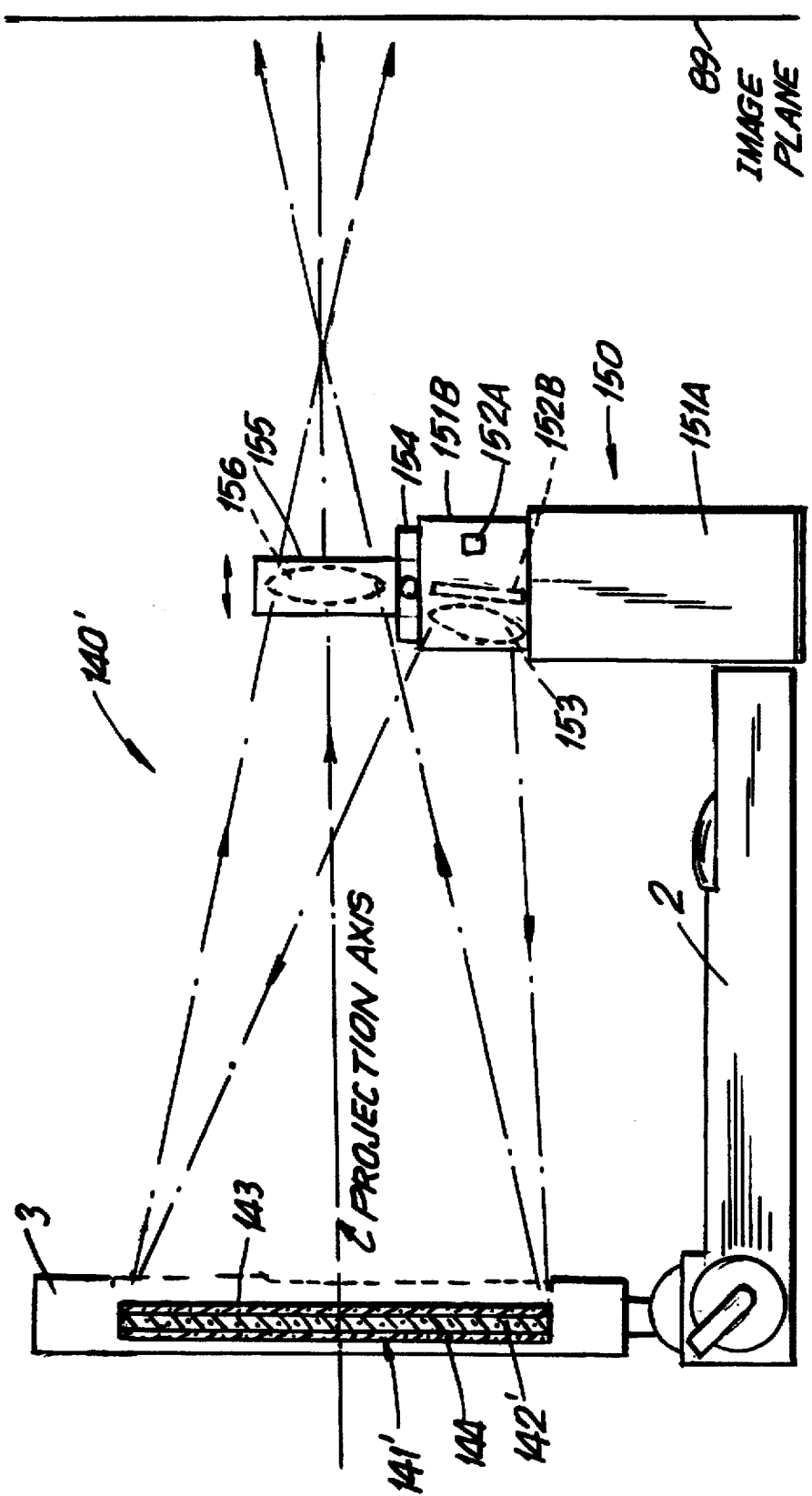
FIG. 12 is an elevated side view of the portable computer-based system of the six illustrative embodiment, showing the computer-based system arranged in its projection viewing configuration.

In FIG. 12, the sixth illustrative embodiment of the computer-based system of the present invention is shown. In general, computer system 140' employs principles of light reflection in order to illuminate the display panel thereof during both direct and projection viewing modes of operation. Also, computer system 140' is similar to computer system 140 in FIG. 11 in all but one respect. In particular, instead of using a reflective-mode LCD panel, the display panel assembly 141' in this embodiment comprises: a transmission-mode LCD panel 142' realized using polymer-dispersed liquid crystal(PDLC) technology known in the art; an ultra-thin light focusing panel 143 e.g. Fresnel or holographic lens panel) attached to the front surface of LCD panel 142'; and a light reflective layer 144 attached to the rear surface of LCD panel 142'. In all other respects, this computer-based system functions the same as the computer-based system of FIG. 11 in both viewing modes of operation, described above.

In FIG. 13, the seventh illustrative embodiment of the computer-based system 170 of the present invention is shown. In this embodiment, the third illustrative embodiment of the light projection device hereof 160 is arranged for use with system 170 in its projection viewing mode of operation. In nearly all respects system 170 is similar to system 1 of FIG. 4C, except that the display panel assembly of system 170 is of a somewhat simpler construction than the display panel assembly of system 1. In particular, whereas display panel assembly of system 170 has ultra-thin lens panel 26 attached to rear surface of active-matrix LCD panel 25 and micropolarization panel 28 affixed to the front surface of LCD panel 25, light guiding panel 22 is hingedly connected to a bottom support bracket 171 by way of hinge mechanism 172 and light reflective surface 27 is affixed to the rear surface of light guiding panel 22, as shown. Light diffusing layers are mounted over both the front and rear light guiding surfaces of the light guiding panel, as hereinbefore described. An optically opaque rear housing panel 173 affixed to the light guiding structure 22 with the light reflective surface 27 disposed therebetween. While not shown in FIG. 13A, for clarity of illustration, light tubes 29 and 30 are fixedly mounted within suitably designed mounts and electrically connected to power supply 19 and controlled by processor 4, as described in connection of the first illustrative embodiment of the computer system shown in FIG. 4C.

During the direct viewing mode of system 170, the rear housing panel 173 is moved into its closed position over rear light transmission aperture 20B, automatically causing the light guiding panel 22 to become positioned closely against ultra-thin lens panel 26 and aligning the light tubes with the light conducting edges of the light guiding panel. During the projection viewing mode shown in FIG. 13, light guiding panel 22 is swung away from the ultra-thin lens panel 26 so that it is disposed about below the bottom portion of the display panel assembly. In the projection viewing configuration, portable light projection device 160 is arranged into its fully extended configuration and is supported from the top portion of the display panel portion of the computer system housing, as shown.

As illustrated in FIG. 13, portable light projection device 160 comprises an number of components, namely: a three-piece extendible support base 175, consisting of sections 175A, 175B and 175C; a mounting bracket 176 attached to support base section 175B and having side walls 176A which releasably engage the upper portion of display panel portion of the computer system housing; a light projection assembly 177 contained within a first housing section 178A telescopically extendible into and projectable from housing sleeve 178B affixed to support base section 175C; and a projection lens 179 supported within an mount 180 attached to an adjustable platform 181 that is extendible into and projectable from a housing sleeve 182 affixed to support base section 175A. With the projection device arranged as shown in FIG. 13, the projection lens 179 is translated along the optical axis 183 of the system until a focused image from LCD panel 25 is projected onto projection surface 184. Preferably, light projection assembly 177 is constructed in a manner similar the light projection assembly of the light projection device 60 of FIG. 4C. One of the principal differences between the systems of FIGS. 4C and 13 is that, in system of FIG. 13, light produced from the light projection device is directly transmitted through the display panel assembly of system 170 and thence through projection lens 179, without undergoing reflection off light reflective surface 27. Using the same intensity light source, this results in greater light transmission and thus enhanced brightness of the projected image.

While the light producing panel of display panel construction hereof has been realized using a light guiding panel, light tubes and light diffusing sheets, it is understood that the light producing panel may be realized using other known backlighting technologies. A number of such backlighting display technologies are disclosed, for example, in the technical paper "New Backlighting Technologies for LCD's" by Kevin J. Hathaway, et al. supra, incorporated herein by reference.

The method and apparatus of the present invention have been described in great detail with reference to the above illustrative embodiments. However, it is understood that other modifications ti the illustrative embodiments will readily occur to persons with ordinary skill in the art. All such modifications and variations are deemed to be within the scope and spirit of the present invention as defined by the accompanying Claims to Invention.

What is claimed:

1. A reconfigurable backlighting construction installed in a computer-based system having a transportable housing, first and second modes of operation, and first and second light transmission apertures formed in said transportable housing, said backlighting construction comprising light producing means installed in said transportable housing, for producing light in the direction of a projection axis during said first mode;

a thin lens panel mounted in said transportable housing along said projection axis;

a light guiding panel having first and second end portions, and first and second light guiding surfaces between which said produced light can be totally internally reflected;

first support means mounted to said first end portion of said light guiding panel, for pivotally supporting said light guiding panel adjacent said thin lens panel during said first mode, and at a preselectable angle with respect to said thin lens panel during said second mode;

a rear housing panel having an interior surface and first and second end portions and a spatial extent sufficient for covering a substantial portion of said first light transmission aperture during said first mode;

a light reflective surface adjacent the interior surface of said rear housing panel;

second support means connected between said second end portion of said light guiding panel and said first end portion of said rear housing panel, for pivotally supporting said rear housing panel adjacent said light guiding panel and said light guiding panel adjacent said thin lens panel during said first mode, and for supporting said rear housing panel adjacent said light guiding panel and said light reflective surface at said preselected angle with respect to said thin lens panel during said second mode;

a light diffusing structure operably associated with said light guiding panel, for scattering light within said light guiding panel during said first mode;

wherein during said first mode, light is produced from said light producing means and is reflected and scattered within said light guiding panel and a portion of said scattered light is transmitted through said first light guiding surface of said light guiding panel along said projection axis, and wherein during said second mode, light is produced from an external source and is reflected off said light reflective surface and transmitted through said thin lens panel along said projection axis.

2. The reconfigurable backlighting construction of claim 1, wherein said light guiding panel further comprises a first light conducting edge through which light produced from said light producing means can be transmitted into said light guiding panel for total internal reflection between said first and second light guiding surfaces.

3. The reconfigurable backlighting construction of claim 1, wherein said light diffusing structure comprises first and second light diffusing layers disposed adjacent said first and second light guiding surfaces respectively for selectively scattering light within said light guiding panel so that a substantially uniform light intensity distribution emanates therefrom in the direction of said thin lens panel during said first mode.

4. The reconfigurable backlighting construction of claim 1, wherein said light guiding panel is made from an optically transparent plastic, and said thin lens panel is selected from the group consisting of a Fresnel lens panel and a holographic lens panel.

5. The reconfigurable backlighting construction of claim 1, wherein said light guiding panel has first and second light conducting edges, and wherein said light producing means comprises first and second fluorescent tubes disposed along said first and second light conducting edges, respectively, said first and second fluorescent tubes producing and transmitting light through said first and second light conducting edges during said first mode.

6. The reconfigurable backlighting construction of claim 5, which further comprises first and second light focusing elements disposed in proximity with said first and second fluorescent tubes, respectively, for focusing light produced from said first and second fluorescent tubes and directing said focused light across said first and second light conducting edges and into said light guiding panel.

7. The reconfigurable backlighting construction of claim 1, in combination with a programmable spatial light mask affixed to said thin lens panel.

8. The reconfigurable backlighting construction of claim 7, which further comprises a micropolarization panel affixed to said programmable spatial light mask.

9. The reconfigurable backlighting construction of claim 1, wherein said preselectable angle is about 45 degrees.

10. An image display device having direct and projection viewing modes of operation, said image display device comprising:

a transportable housing having first and second light transmission apertures formed therethrough;

light producing means installed in said transportable housing, for producing light along a projection axis during said direct viewing mode;

a thin lens panel mounted in said transportable housing along said projection axis;

a light guiding panel having first and second end portions, and first and second light guiding surfaces between which said produced light can be totally internally reflected;

first support means mounted to said first end portion of said light guiding panel, for pivotally supporting said light guiding panel adjacent said thin lens panel during said direct viewing mode, and for pivotally supporting said light guiding panel at a preselectable angle with respect to said thin lens panel during said projection viewing mode;

a rear housing panel having an interior surface and first and second end portions and a spatial extent sufficient for covering a substantial portion of said first light transmission aperture during said direct viewing mode;

a light reflective surface disposed adjacent the interior surface of said rear housing panel;

second support means connected between said second end portion of said light guiding panel and said first end portion of said rear housing panel, for pivotally supporting said rear housing panel adjacent said light guiding panel and said light guiding panel adjacent said thin lens panel during said direct viewing mode, and for supporting said rear housing panel adjacent said light guiding panel and said light reflective surface at a preselectable angle with respect to said thin lens panel during said projection viewing mode;

a light diffusing structure operably associated with said light guiding panel, for scattering light within said light guiding panel during said direct viewing mode;

a programmable spatial light mask, disposed in said transportable housing, and having a display surface and means for spatially modulating the intensity of light transmitted through said programmable spatial light mask during said projection viewing mode;

wherein during said direct viewing mode, light is produced from said light producing means and is reflected within said light guiding panel and scattered by said light diffusing structure and a portion of said scattered light is transmitted through said first light guiding surface and said programmable spatial light mask, whereupon said transmitted light is spatial-intensity modulated so as to form a light image on the display surface of said programmable spatial light mask, and wherein during said projection viewing mode, light is produced from an external source and is reflected off said light reflective surface and transmitted through said thin lens panel and said programmable spatial light mask, whereupon said transmitted light is focused and spatial-intensity modulated so as to form a light image on a viewing surface disposed at a distance from said programmable spatial light mask.

11. The image display device of claim 10, which further comprises means for displaying on said display surface, a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, and said second spatial modulation pattern being a logical complement of said first spatial modulation pattern, and wherein said image display device further comprises a micropolarization panel comprising a optically transparent sheet mounted onto said display surface of said programmable spatial light mask, said optically transparent sheet having first and second optically transparent patterns permanently formed in first optically transparent sheet, said first optically transparent pattern spatially corresponding to and being spatially aligned with said first pixel pattern so as to impart a first polarization state $P_1$ to said first pixel pattern, and said second optically transparent pattern spatially corresponding to and being spatially aligned with said second pixel pattern so as to impart a second polarization state $P_2$ to said second pixel pattern, said second polarization state $P_2$ being different than said first polarization state $P_1$.

12. The image display device of claim 11, wherein said thin lens panel is selected from the group consisting of a Fresnel lens panel and a holographic lens panel.

13. The image display device of claim 10, wherein said light guiding panel has first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

14. The image display device of claim 13, which further comprises first and second light focusing elements disposed in proximity with said first and second fluorescent tubes, respectively, for focusing light produced from said first and second fluorescent tubes and directing said focused light across said first and second light conducting edges and into said light guiding panel.

15. A portable computer-based system having direct and projection viewing modes of operation, comprising:

a transportable housing of compact construction and having first and second light transmission apertures formed therein and aligned with each other;

data storage means, disposed in said transportable housing, for storing data representative of one or more light images to be displayed;

a reconfigurable backlighting construction disposed in said transportable housing and having direct and projection viewing modes of operation, said reconfigurable backlighting construction including light producing means installed in said transportable housing, for producing light in the direction of a projection axis during said direct viewing mode, a thin lens panel mounted in said transportable housing along said projection axis, a light guiding panel having first and second end portions, and first and second light guiding surfaces between which said produced light can be totally internally reflected, first support means mounted to said first end portion of said light guiding panel, for pivotally supporting said light guiding panel adjacent said thin lens panel during said direct viewing mode, and for pivotally supporting said light guiding panel at a preselectable angle with respect to said thin lens panel during said projection viewing mode, a rear housing panel having an interior surface and first and second end portions and a spatial extent sufficient for covering a substantial portion of said first light transmission aperture during said direct viewing mode, a light reflective surface disposed adjacent the interior surface of said rear housing panel, second support means connected between said second end portion of said light guiding panel and said first end portion of said rear housing panel, for pivotally supporting said rear housing panel adjacent said light guiding panel and said light guiding panel adjacent said thin lens panel during said direct viewing mode, and for supporting said rear housing panel adjacent said light guiding panel and said light reflective surface at said preselectable angle with respect to said thin lens panel during said projection viewing mode, and a light diffusing structure operably associated with said light guiding panel, for scattering light within said light guiding panel during said direct viewing mode;

a programmable spatial light mask, disposed adjacent said thin lens panel, and having a display surface and means for spatially modulating the intensity of light transmitted through said programmable spatial light mask;

wherein during said direct viewing mode, light is produced from said light producing means and is reflected within said light guiding panel and scattered by said light diffusing structure, and a portion of said scattered light is transmitted through said first light guiding surface and said programmable spatial light mask, whereupon said transmitted light is spatial-intensity modulated so as to form a light image on the display surface of said programmable spatial light mask, and wherein during said projection viewing mode, light is produced from an external source and is reflected off said light reflective surface and transmitted through said thin lens panel and said programmable spatial light mask, whereupon said transmitted light is focused and spatial-intensity modulated so as to produce a light pattern on a viewing surface disposed at a distance from said programmable spatial light mask.

16. The portable computer-based system of claim 15, wherein said preselectable angle is about 45 degrees.

17. The portable computer-based system of claim 16, wherein said light guiding panel further comprises a first light conducting edge through which light produced from said light producing means can be transmitted into said light guiding panel for total internal reflection between said first and second light guiding surfaces.

18. The portable computer-based system of claim 17, which further comprises:

means for displaying on said display surface, a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, said second spatial modulation pattern being a logical complement of said first spatial modulation pattern; and a micropolarization panel comprising an optically transparent sheet mounted onto said display surface of said programmable spatial light mask, said optically transparent sheet having first and second optically transparent patterns permanently formed in said optically transparent sheet, said first optically transparent pattern spatially corresponding to and being spatially aligned with said first pixel pattern so as to impart a first polarization state $P_1$ to said first pixel pattern, and said second optically transparent pattern spatially corresponding to and being spatially aligned with said second pixel pattern so as to impart a second polarization state $P_2$ to said second pixel pattern, said second polarization state $P_2$ being different than said first polarization state $P_1$.

19. The portable computer-based system of claim 15, which further comprises a display control means for controlling the spatial intensity of light emerging from said programmable spatial light mask, and wherein said programmable spatial light mask comprises a liquid crystal display panel comprising an array of electrically addressable pixels, each said pixel having a light transmittance that is controllable by said display control means.

20. The portable computer-based system of claim 15, wherein said light guiding panel is made from a optically transparent plastic.

21. The portable computer-based system of claim 16, wherein said light guiding panel comprises first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

22. The portable computer-based system of claim 21, wherein said reconfigurable backlighting construction further comprises first and second light focusing elements disposed in proximity with said first and second fluorescent tubes, respectively, for focusing light produced from said first and second fluorescent tubes and directing said focused light across said first and second light conducting edges and into said light guiding panel.

23. An image display device having direct and projection viewing modes of operation, comprising:

a transportable housing having first and second light transmission apertures formed therein and aligned with each other;

light producing means installed in said transportable housing, for producing light in the direction of a projection axis during said direct viewing mode;

a thin lens panel mounted in said transportable housing along said projection axis;

a light guiding panel having first and second light guiding surfaces between which said produced light can be totally internally reflected;

a rear housing panel for covering a substantial portion of said first light transmission aperture during said direct viewing mode, and having an interior surface;

a light reflective surface disposed on said interior surface of said rear housing panel;

a light diffusing structure operably associated with said light guiding panel, for scattering light within said light guiding panel during said direct viewing mode;

a programmable spatial light mask disposed adjacent said thin lens panel, having a display surface and means for spatially modulating the intensity of light transmitted through said thin lens panel during said projection viewing mode;

wherein during said direct viewing mode, light is produced from said light producing means and is reflected within said light guiding panel and scattered by said light diffusing structure, and a portion of said scattered light is transmitted through said first light guiding surface and said programmable spatial light mask, whereupon said transmitted light is spatial-intensity modulated so as to form a light image on the display surface of said programmable spatial light mask; and wherein during said projection viewing mode, light is produced from an external source and is transmitted through said thin lens panel and said programmable spatial light mask, whereupon said transmitted light is focused and spatial-intensity modulated so as to form a light image on a viewing surface disposed at a distance from said programmable spatial light mask.

24. The image display device of claim 23, which further comprises means for displaying on said display surface, a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, said second spatial modulation pattern being a logical complement of said first spatial modulation pattern, and a micropolarization panel comprising an optically transparent sheet mounted onto said display surface of said spatial light mask, said optically transparent sheet having first and second optically transparent patterns permanently formed in said optically transparent sheet, said first optically transparent pattern spatially corresponding to and being spatially aligned with said first pixel pattern so as to impart a first polarization state $P_1$ to said first pixel pattern, and said second optically transparent pattern spatially corresponding to and being spatially aligned with said second pixel pattern so as to impart a second polarization state $P_2$ to said second pixel pattern, said second polarization state $P_2$ being different than said first polarization state $P_1$.

25. The image display device of claim 24 in combination with electrically-passive polarization glasses.

26. The image display device of claim 23, wherein said light guiding panel has first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

27. The image display device of claim 26, which further comprises first and second light focusing elements disposed in proximity with said first and second fluorescent tubes, respectively, for focusing light produced from said first and second fluorescent tubes and directing said focused light across said first and second light conducting edges and into said light guiding panel.

28. The image display device of claim 23, which further comprises an optically transparent touch-screen panel disposed adjacent said programmable spatial light mask.

29. A portable computer-based system having direct and projection viewing modes of operation, comprising:

(A) a transportable housing of compact construction and having first and second light transmission apertures formed therein and aligned with each other;

(B) data storage means, disposed in said transportable housing, for storing data representative of one or more light images to be displayed;

(C) a backlighting construction disposed in said transportable housing, having direct and projection viewing modes of operation, and including (1) light producing means installed in said transportable housing, for producing light in the direction of a projection axis during said direct viewing mode, (2) a thin lens panel mounted in said transportable housing along said projection axis, (3) a light guiding panel having first and second end portions, and first and second light guiding surfaces between which said produced light can be totally internally reflected, (4) a rear housing panel having a spatial extent sufficient for covering a substantial portion of said first light transmission aperture during said direct viewing mode, (5) a light reflective surface disposed adjacent the interior surface of said rear housing panel, and (6) a light diffusing structure operably associated with said light guiding panel, for scattering light within said light guiding panel during said direct viewing mode;

(D) a programmable spatial light mask, disposed adjacent said thin lens panel, having a display surface and means for spatially modulating the intensity of light transmitted through said programmable spatial light mask;

wherein during said direct viewing mode, light is produced by said light producing means and is reflected within said light guiding panel and scattered by said light diffusing structure, and a portion of said scattered light is transmitted through said first light guiding surface and said programmable spatial light mask, whereupon said transmitted light is spatial-intensity modulated so as to form a light pattern on the display surface of said programmable spatial light mask, and wherein during said projection viewing mode, light is produced from an external source and is reflected off said light reflective surface and transmitted through said thin lens panel and said programmable spatial light mask, whereupon said transmitted light is focused and spatial-intensity modulated so as to form a light image on a viewing surface at a distance from said programmable spatial light mask.

30. The portable computer-based system of claim 29, wherein said light guiding panel further comprises a first light conducting edge through which light produced from said light producing means can be transmitted into said light guiding panel for total internal reflection between said first and second light guiding surfaces.

31. The portable computer-based system of claim 29, which further comprises:

means for displaying on said display surface, a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, said second spatial modulation pattern being a logical complement of said first spatial modulation pattern; and a micropolarization panel comprising a optically transparent sheet mounted onto said display surface of said programmable spatial light mask, said optically transparent sheet having first and second optically transparent patterns permanently formed in said optically transparent sheet, said first optically transparent pattern spatially corresponding to and being spatially aligned with said first pixel pattern so as to impart a first polarization state $P_1$ to said first pixel pattern, and said second optically transparent pattern spatially corresponding to and being spatially aligned with said second pixel pattern so as to impart a second polarization state $P_2$ to said second pixel pattern, said second polarization state $P_2$ being different than said first polarization state $P_1$.

32. The portable computer-based system of claim 29, which further comprises a display control means for controlling the spatial intensity of light emerging from said programmable spatial light mask, and wherein said programmable spatial light mask comprises a liquid crystal display panel comprising an array of electrically addressable pixels, each said pixel having a light transmittance that is controllable by said display control means.

33. The portable computer-based system of claim 29, wherein said light guiding panel is made from a optically transparent plastic.

34. The portable computer-based system of claim 29, wherein said light guiding panel comprises first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

35. The portable computer-based system of claim 29, wherein said backlighting construction further comprises first and second light focusing elements disposed in proximity with said first and second fluorescent tubes, respectively, for focusing light produced from said first and second fluorescent tubes and directing said focused light across said first and second light conducting edges and into said light guiding panel.

36. An image display device having direct and projection viewing modes of operation, comprising:

a transportable housing having first and second light transmission apertures formed therein and aligned with each other;

light producing means installed in said transportable housing, for producing light along a projection axis during said direct viewing mode;

a thin light focusing element mounted in said transportable housing along said projection axis;

a rear housing panel having an interior surface and a spatial extent sufficient for covering a substantial portion of said first light transmission aperture during said direct viewing mode;

a light guiding panel attached to said rear housing portion, and having first and second light guiding surfaces between which said produced light can be totally internally reflected, said light guiding panel having first and second light conducting edges;

said light producing means including first and second fluorescent tubes disposed along said first and second light conducting edges, respectively, and said first and second fluorescent tubes producing and transmitting light through said first and second light conducting edges during said direct viewing mode;

means for hingedly connecting said light guiding panel or said rear housing panel to said transportable housing;

first and second light focusing elements disposed in proximity with said first and second fluorescent tubes, respectively, for focusing light produced from said first and second fluorescent tubes and directing said focused light across said first and second light conducting edges and into said light guiding panel;

a light reflective surface disposed between said light guiding panel and the interior surface of said rear housing panel;

a light diffusing structure operably associated with said light guiding panel, for scattering light within said light guiding panel during said direct viewing mode; and a programmable spatial light mask disposed adjacent said thin lens panel, and having a display surface and means for spatially modulating the intensity of light transmitted through said programmable spatial light mask during said projection viewing mode;

wherein during said direct viewing mode, light is produced from said light producing means and is reflected within said light guiding panel and scattered by said light diffusing structure, and a portion of said scattered light is transmitted through said first light guiding surface and said programmable spatial light mask, whereupon said transmitted light is spatial-intensity modulated so as to form a light image on the display surface of said programmable spatial light mask; and wherein during said projection viewing mode, light is produced from an external source and is transmitted through said thin light focusing element and said programmable spatial light mask, whereupon said transmitted light is focused and spatial-intensity modulated so as to form a light image on a viewing surface disposed at a distance from said programmable spatial light mask.

* * * * *